(12) United States Patent
Hung et al.

(10) Patent No.: US 12,416,761 B2
(45) Date of Patent: Sep. 16, 2025

(54) BROADBAND RING RESONATOR AND DESIGN SYSTEM THEREOF

(71) Applicant: Wistron Corporation, New Taipei (TW)

(72) Inventors: Yung-Jr Hung, New Taipei (TW); Cheng-Hsuan Wu, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 359 days.

(21) Appl. No.: 18/067,874

(22) Filed: Dec. 19, 2022

(65) Prior Publication Data

US 2024/0036261 A1   Feb. 1, 2024

(30) Foreign Application Priority Data

Jul. 29, 2022 (TW) .................................. 111128683

(51) Int. Cl.
*G02B 6/293* (2006.01)
*G02B 27/00* (2006.01)

(52) U.S. Cl.
CPC ..... *G02B 6/29338* (2013.01); *G02B 27/0012* (2013.01)

(58) Field of Classification Search
None
See application file for complete search history.

(56) References Cited

U.S. PATENT DOCUMENTS 10,670,811 B2   6/2020 Tu
2012/0081197 A1   4/2012 Park
(Continued)

FOREIGN PATENT DOCUMENTS

CN   113866896 A   12/2021
JP   S55103509 A   8/1980
(Continued)

OTHER PUBLICATIONS

Timo T. Aalto, Mikko Harjanne, Markku Kapulainen, Paivi Heimala, Matti J. Leppihalme, "Development of silicon-on-insulator waveguide technology," Proc. SPIE 5355, Integrated Optics: Devices, Materials, and Technologies VIII, (May 28, 2004) (Year: 2004).*
(Continued)

*Primary Examiner* — Jerry Rahll
(74) *Attorney, Agent, or Firm* — McClure, Qualey & Rodack, LLP

(57) ABSTRACT

A broadband ring resonator includes a first waveguide and a second waveguide. The first waveguide is a closed loop having a first coupling section having a first width and a first curvature radius. The second waveguide includes a first section, a second coupling section, and a second section which are connected in sequence. The second coupling section has a second width and a second curvature radius. Coupling ratios of the second waveguide coupled to the first waveguide within a broadband have a similarity to each other. A coupling angle is respectively between two ends of the first coupling section and between two ends of the second coupling section, and the first and second coupling sections are separated by a coupling gap. The second curvature radius is greater than the first curvature radius. A ratio of the first width with respect to the second width ranges from 1.3 to 1.7.

17 Claims, 28 Drawing Sheets

(56) References Cited

U.S. PATENT DOCUMENTS

| | | |
|---|---|---|
| 2013/0088309 A1 | 4/2013 | Baik |
| 2013/0181725 A1 | 7/2013 | Mazzaro |
| 2016/0139487 A1 | 5/2016 | Popovic et al. |
| 2017/0186710 A1 | 6/2017 | Yoon |
| 2018/0083410 A1* | 3/2018 | Kang .................. H01S 3/0637 |

FOREIGN PATENT DOCUMENTS

| | | |
|---|---|---|
| JP | 2015230465 A | 12/2015 |
| TW | 200933971 A | 8/2009 |
| WO | WO-2021224240 A1 * | 11/2021 |

OTHER PUBLICATIONS

Bogaerts, W., et al.; "Silicon-microring-resonators;" Laser Photonics Rev. 6; No. 1; 2012; pp. 47-73.

Examination report dated Mar. 12, 2024, listed in related Japan patent application No. 2022-167035.

Dai, Daoxin, Advanced Passive Silicon Photonic Devices With Asymmetric Waveguide Structures, Proceedings of the IEEE, vol. 106, No. 12, Dec. 2018, pp. 2117-2143.

Notice of Allowance dated Jun. 27, 2023, listed in related Taiwan patent application No. 111128683.

Examination report dated Oct. 31, 2023, listed in related Japan patent application No. 2022-167035.

The extended European search report dated Dec. 21, 2023, listed in related European patent application No. 23158469.9.

Examination report dated Mar. 28, 2025, listed in related Taiwan patent application No. 112131235 (publication No. 202406206).

Zhou et al. "Miniature Microring Resonator Sensor Based on a Hybrid Plasmonic Waveguide".Physical Sensors. 11 (7). Physical Sensors. Jul. 1, 2011.6856-6867 Fig. 1 & corresponding paragraphs.

* cited by examiner

BROADBAND RING RESONATOR AND DESIGN SYSTEM THEREOF

CROSS-REFERENCE TO RELATED APPLICATION

This non-provisional application claims priority under 35 U.S.C. § 119(a) to Patent Application No. 111128683 filed in Taiwan, R.O.C. on Jul. 29, 2022, and the entire contents of which are hereby incorporated by reference.

BACKGROUND

Technical Field

The instant disclosure relates to a ring resonator, particularly to a ring resonator capable of exhibiting a high uniformity between several optical output performances in a broadband (or called broad wavelength band). The instant disclosure also relates to a design system of a ring resonator, particularly to a design system for designing and obtaining configuration parameters of the ring resonator.

Related Art

Ring resonators (or called micro-ring resonators (MRRs)) are quite important basic elements in the high-density integrated optical system. Generally, a ring resonator includes a closed waveguide and a long straight waveguide. The two waveguides are adjacent to each other for optical coupling, and photons thus can be coupled from the long straight waveguide to the closed waveguide. The closed waveguides are mostly fabricated as micron-scale dimensions, so as to be integrated with integrated circuits to realize high-density optoelectronic integrated circuits in the same wafer.

SUMMARY

Accordingly, in some embodiments, a broadband ring resonator is provided. The broadband ring resonator comprises a first waveguide and a second waveguide. The first waveguide is a closed loop having a first coupling section, and the first coupling section has a first width and a first curvature radius. The second waveguide comprises a first section, a second coupling section, and a second section which are sequentially connected to each other. The second coupling section has a second width and a second curvature radius. Coupling ratios of the second waveguide coupled to the first waveguide in a broadband are have a similarity to each other. The second curvature radius is greater than the first curvature radius. $1.3 \leq W_1/W_2 \leq 1.7$, wherein $W_1$ is the first width and $W_2$ is the second width.

According to some embodiments, a coupling angle is respectively between two ends of the first coupling section and between two ends of the second coupling section, and the first coupling section and the second coupling section are separated by a coupling gap.

According to some embodiments, a wavelength section of incident light corresponding to the broadband ranges from 1,250 nm to 1,370 nm.

According to some embodiments, a wavelength section of incident light corresponding to the broadband ranges from 1,280 nm to 1,330 nm.

According to some embodiments, the second curvature radius is obtained according to a relation of radius and effective index of Formula 1, $$100\% = \frac{n_{\mathit{eff}1}}{n_{\mathit{eff}2}} \cdot \frac{R_1}{R_2} \pm d \quad \text{(Formula 1)}$$

wherein $n_{\mathit{eff}1}$ represents a first effective index, $n_{\mathit{eff}2}$ represents a second effective index, $R_1$ represents the first curvature radius, $R_2$ represents the second curvature radius, and d represents a tolerance not greater than 10%.

According to some embodiments, the coupling ratios that have a similarity to each other range from 0% to 85%.

According to some embodiments, the coupling ratios that have a similarity to each other are obtained by adjusting one selected from the group consisting of the coupling angle, the first width, and a combination thereof.

According to some embodiments, the broadband ring resonator further comprises a base layer, a first protection layer, a waveguide layer, and a second protection layer. The first protection layer is on the base layer. The waveguide layer is on the first protection layer, and the first waveguide and the second waveguide are on the waveguide layer. The second protection layer is on the waveguide layer.

Furthermore, a design system of broadband ring resonator is provided. The design system of broadband ring resonator obtains configuration parameters of a broadband ring resonator based on a simulation resonate element. The simulation resonate element has a first waveguide and a second waveguide. The first waveguide comprises a first coupling section, and the second waveguide comprises a second coupling section. A coupling angle is between two ends of the first coupling section and between two ends of the second coupling section, and the first coupling section and the second coupling section are separated by a coupling gap. The design system of the broadband ring resonator comprises a user interface and a processor. The user interface is for receiving the coupling gap, a plurality of waveguide widths, and a plurality of waveguide curvature radii. The processor is for being in communication with the user interface, and the processor:
  obtains a relation of radius and effective index to obtain a width of the first coupling section, a curvature radius of the first coupling section, a width of the second coupling section, and a curvature radius of the second coupling section based on the relation of radius and effective index;
  adjusts the coupling angle, and a coupling ratio of the second waveguide is coupled to the first waveguide in a broadband band, wherein the coupling ratios of the first waveguide and the second waveguide have a similarity to each other by adjusting the coupling angle;
  adjusts one selected from the group consisting of the width of the first coupling section, the curvature radius of the first coupling section, the width of the second coupling section, the curvature radius of the second coupling section, the coupling gap, the coupling angle, and any combination thereof, and the coupling ratios in the broadband range from 0% to 100%; and
  outputs the configuration parameters comprising the width of the first coupling section, the curvature radius of the first coupling section, the width of the second coupling section, the curvature radius of the second coupling section, the coupling gap, and the coupling angle.

According to some embodiments, the processor further adjusts one of the configuration parameters to increase or decrease the coupling ratios originally ranging from 0% to 100% by 1% to 20% to output the increased or decreased coupling ratios and the configuration parameters corresponding to the increased or decreased coupling ratios.

According to some embodiments, the relation of radius and effective index meets Formula 1, $$100\% = \frac{n_{eff1}}{n_{eff2}} \cdot \frac{R_1}{R_2} \pm d \quad \text{(Formula 1)}$$

wherein $n_{eff1}$ represents a first effective index, $n_{eff2}$ represents a second effective index, $R_1$ represents the first curvature radius, $R_2$ represents the second curvature radius, and d represents a tolerance not greater than 10%.

DETAILED DESCRIPTION

Figure 1:
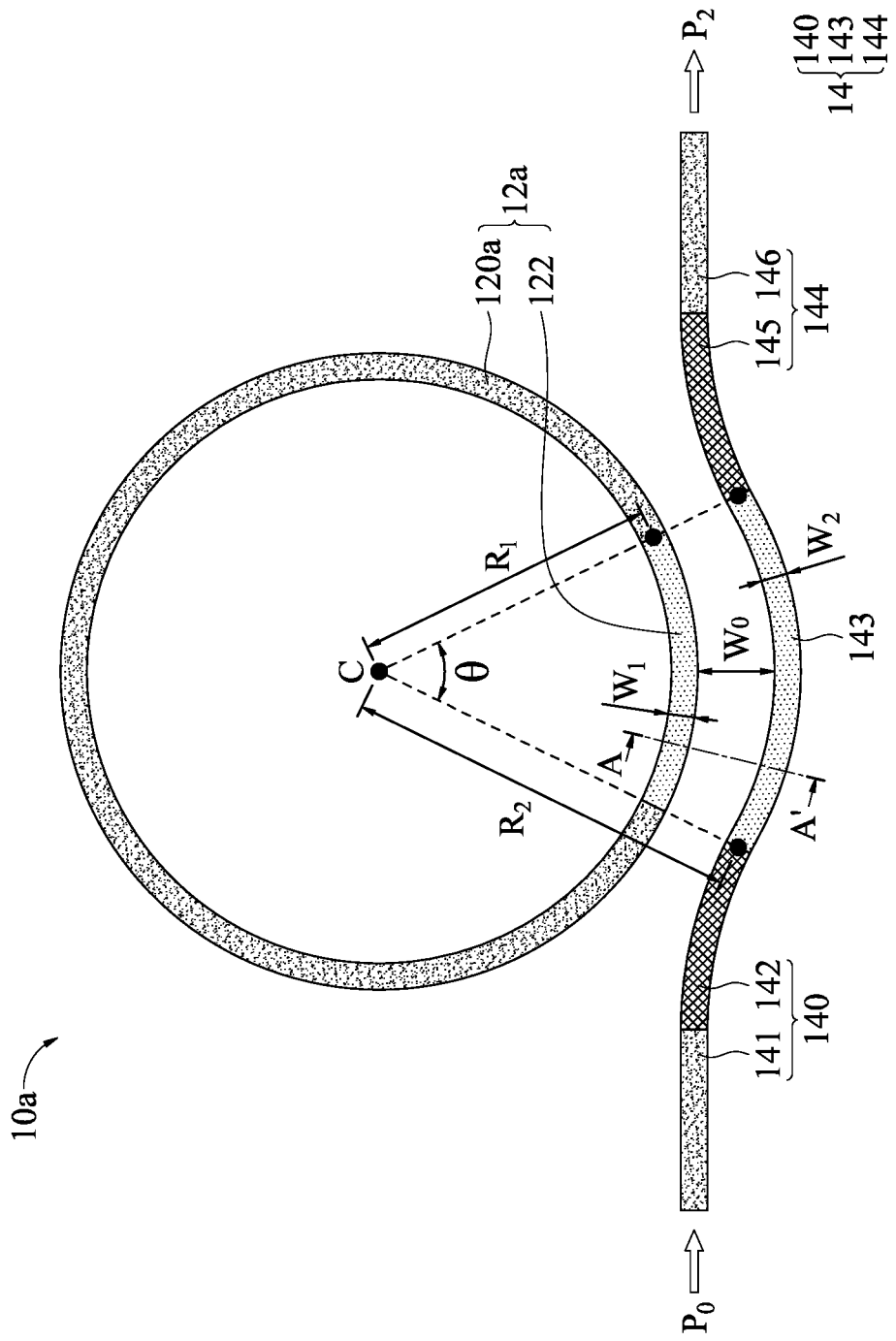
FIG. 1 illustrates a schematic top view of a broadband ring resonator according to some embodiments.
Figure 2:
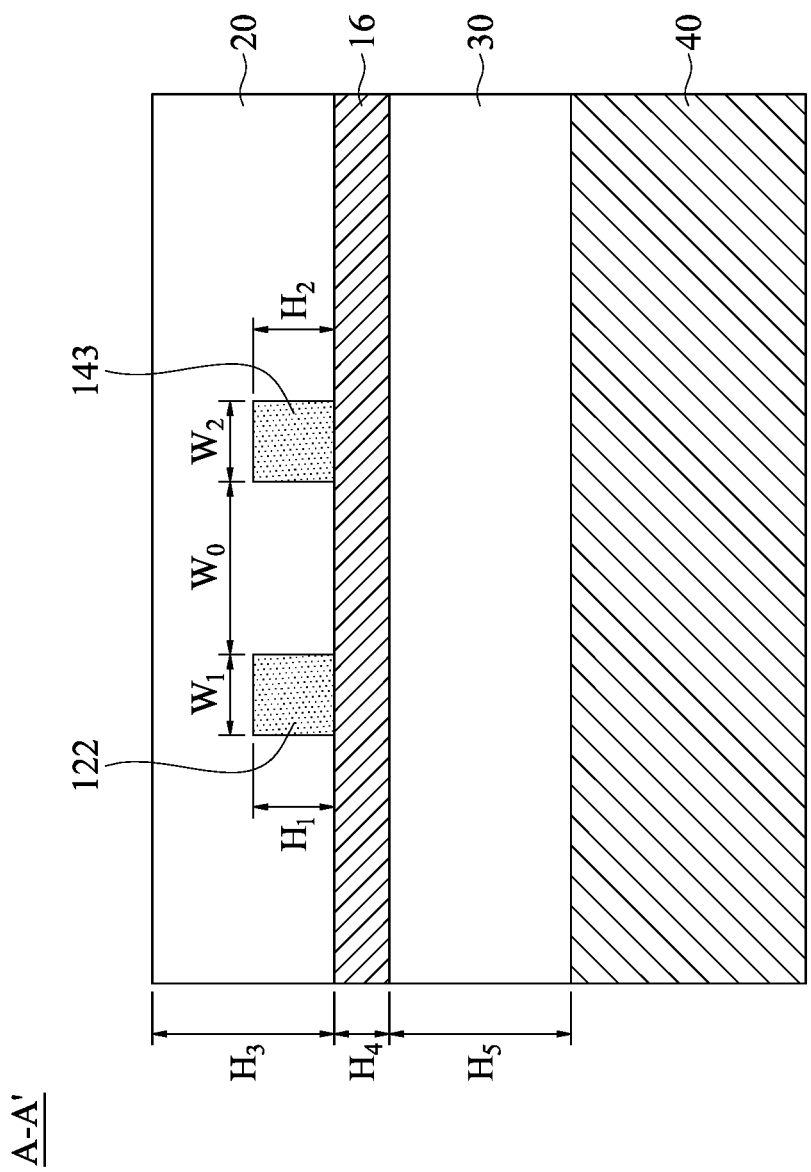
FIG. 2 illustrates a schematic cross-sectional view of the broadband ring resonator along the line A-A' shown in FIG. 1.

Please refer to FIG. 1 and FIG. 2 at the same time. FIG. 1 illustrates a schematic top view of a broadband ring resonator 10a according to some embodiments, and FIG. 2 illustrates a schematic cross-sectional view of the broadband ring resonator 10a along the line A-A' shown in FIG. 1. In FIG. 1 and FIG. 2, a broadband ring resonator 10a comprises a first waveguide 12a and a second waveguide 14. The first waveguide 12a is a closed loop 120a having a center C; for example, the first waveguide 12a may be a ring waveguide. The closed loop 120a has a first coupling section 122, and a width and a curvature radius of the first coupling section 122 are respectively denoted as a first width $W_1$ and a first curvature radius $R_1$. The first curvature radius $R_1$ refers to a distance from the center C to a center between the outer curvature radius and the inner curvature radius of the first coupling section 122; that is, in this embodiment, the first curvature radius $R_1$ refers to the distance obtained by adding half of the first width $W_1$ to the inner curvature radius of the first coupling section 122. The second waveguide 14 comprises a first section 140, a second coupling section 143, and a second section 144 which are sequentially connected to each other; for example, the second waveguide 14 may be a curved directional coupler (CDC; or called a bus waveguide). The second coupling section 143 is parallel to the first coupling section 122, and the first coupling section 122 and the second coupling section 143 are separated by a coupling gap $W_0$. Therefore, the center C of the closed loop 120a may be the center of the second coupling section 143. A width and a curvature radius of the second coupling section 143 are respectively denoted as a second width $W_2$ and a second curvature radius $R_2$. The second curvature radius $R_2$ refers to a distance from the center C to the center between the outer curvature radius and inner curvature radius of the second coupling section 143; that is, in this embodiment, the second curvature radius $R_2$ refers to the distance obtained by adding half of the second width $W_2$ to the inner curvature radius of the second coupling section 143. The second curvature radius $R_2$ is greater than the first curvature radius $R_1$. A ratio of the first width $W_1$ with respect to the second width $W_2$ may, for example but not limited to, range from 1.3 to 1.7, that is, $1.3 \leq W_1/W_2 \leq 1.7$. Two ends of the first coupling section 122 has a coupling angle θ, and two ends of the second coupling section 143 has the coupling angle θ; that is, in this embodiment, the coupling angle θ is formed between the lines connecting the center C and two ends of the first coupling section 122, as well as formed between the lines connecting the center C and two ends of the second coupling section 143. The coupling angle θ of the first coupling section 122 and the coupling angle θ of the second coupling section 143 are substantially the same. Hence, as shown in Formula 2 below, a dimension relationship exists among the coupling gap $W_0$, the first width $W_1$, the first curvature radius $R_1$, the second width $W_2$, and the second curvature radius $R_2$.

$$R_2 = R_1 + W_0 + \frac{W_1 + W_2}{2} \qquad \text{(Formula 2)}$$

Further, through simulating and matching configuration parameters by the Coupled-Mode Theory and a phase matching condition, the coupling gap $W_0$, the first width $W_1$, the first curvature radius $R_1$, the second width $W_2$, the second curvature radius $R_2$, the coupling angle θ of the first coupling section 122, and the coupling angle θ of the second coupling section 143 can be thus substantially matched (which will be described later) to exhibit a high uniformity between the optical output performances in a broadband (for example, high uniform resonant dips and optical losses, which will be described later). The broadband may be, for example but not limited to, an O band (corresponding to a wavelength section ranging from 1,260 nm to 1,360 nm), an E band (corresponding to a wavelength section ranging from 1,360 nm to 1,460 nm), an S band (corresponding to a wavelength section ranging from 1,460 nm to 1,530 nm), a C band (corresponding to a wavelength section ranging from 1,530 nm to 1,565 nm), an L band (corresponding to a wavelength section ranging from 1,565 nm to 1,625 nm), or a U band (corresponding to a wavelength section ranging from 1,625 nm to 1,675 nm). Accordingly, through the same obtained configuration parameters of the designed broadband ring resonator 10a, the broadband ring resonator 10a according to some embodiments is provided and suitable for the incident lights with various wavelength sections entering from an end of the second waveguide 14 and optically coupled to the first waveguide 12a. These coupling ratios of the incident lights with various wavelengths can have a similarity to each other, and a high uniformity between several optical output performances of the broadband ring resonator 10a in the broadband may be obtained after adjusting the configuration parameters.

Please refer to FIG. 2. In some embodiments, the broadband ring resonator 10a is applied to a platform of silicon photonics, thereby having functions such as high-speed optical interconnection, chemical and/or biomedical sensing, temperature sensing, optical computing, and optical spectral filtering. For example, in FIG. 2, the broadband ring resonator 10a further comprises a base layer 40, a first protection layer 30, a waveguide layer 16, and a second protection layer 20. The first protection layer 30 is on the base layer 40. The first waveguide 12a and the second waveguide 14 are on the waveguide layer 16. The second protection layer 20 is on the waveguide layer 16 (including the first waveguide 12a and the second waveguide 14). The material of the base layer 40 may be, for example but not limited to, silicon, and a thickness of the base layer 40 is not particularly limited. The material of the first protection layer 30 may be, for example but not limited to, silicon dioxide ($SiO_2$), and a thickness $H_5$ of the first protection layer 30 may, for example but not limited to, range from 1 μm to 10 μm. The material of the waveguide layer 16 may be, for example but not limited to, silicon, and a thickness $H_4$ of the waveguide layer 16 may be, for example but not limited to, less than or equal to 150 nm. The materials of the first waveguide 12a and the second waveguide 14 may be, for example but not limited to, silicon, respectively. The first waveguide 12a and the second waveguide 14 may respectively protrude from the surface of the waveguide layer 16. For example, each of the top surface of the first waveguide 12a and the top surface of the second waveguide 14 protrudes from the surface of the waveguide layer 16 by a convex height $H_1$ and a convex height $H_2$. The convex heights $H_1$, $H_2$ may, for example but not limited to, independently range from 70 nm to 220 nm. The material of the second protection layer 20 may be, for example but not limited to, $SiO_2$. A distance between the top surface of the second protection layer 20 and the surface of the waveguide layer 16 is a thickness $H_3$, and the thickness $H_3$ may, for example but not limited to, range from 1 μm to 10 μm. Accordingly, through the apparent difference of refractive indexes between the first waveguide 12a as well as the second waveguide 14 (which are made of silicon and respectively served as the light guide layers of the silicon optical waveguide) and the first protection layer 30 as well as the second protection layer 20 (which are made of $SiO_2$ and respectively served as the cladding layer), silicon optical waveguides with more compact dimensions and higher optical confinement are provided, so that the broadband ring resonator 10a can be further applied to large-scaled integrated optical systems. Moreover, through allowing the first coupling section 122 and the second coupling section 143 to be substantially matched each other to have a boarder process window (which will be described later), according to some embodiments, the broadband ring resonator 10a can have wider design dimensions and thus the allowable error limitations for fabricating the broadband ring resonator 10a can be widened. Meanwhile, under such widened allowable error limitations, the broadband ring resonator 10a having a high uniformity between several optical output performances in a broadband can still be fabricated. Hence, according to some embodiments, difficult challenges for more precisely controlling the process errors during the fabrication of the broadband ring resonator 10a under the micron-scale dimension, such as an optical lithography of a complementary metal-oxide-semiconductor (CMOS) wafer fabrication, can be thus overcome.

To illustrate the following embodiments more clearly, the broadband ring resonator 10a applied to the platform of silicon photonics is simply exemplarily described herein, which is not used to limit the invention to those specific embodiments.

Please refer to FIG. 1 again. In some embodiments, the first section 140 comprises a first front section 141 and a first middle section 142, and the second section 144 comprises a second middle section 145 and a second end section 146. The first front section 141 and the second end section 146 are connected to each other by sequentially connecting the first middle section 142, the second coupling section 143, and the second middle section 145. One of two ends of the first middle section 142 is connected to the straight first front section 141, and the other end of the first middle section 142 is connected to the second coupling section 143. The first middle section 142 has a curvature radius and a center, and the center of the first middle section 142 is on the opposite side of the center C. One of two ends of the second middle section 145 is connected to the section coupling section 143, and the other end of the second middle section 145 is connected to the straight second end section 146. Similarly, the second middle section 145 has a curvature radius and a center, and the center of the second middle section 145 is on the opposite side of the center C. The shapes and the curvature radii of the first middle section 142 and the second middle section 145 may be identical to each other (for example, the first middle section 142 and the second middle section 145 are mirror symmetrical to each other) or different from each other. Accordingly, according to some embodiments, through the configuration of the first middle section 142 and the second middle section 145, the coupling between the first coupling section 122 and the second coupling section 143 (for example, the coupling angle θ and a coupling length, such as the second curvature radius $R_2$ multiplying the coupling angle θ) can be more precisely modulated, so that the first coupling section 122 and the second coupling section 143 can be substantially matched to each other more precisely (which will be described later).

Figure 3:
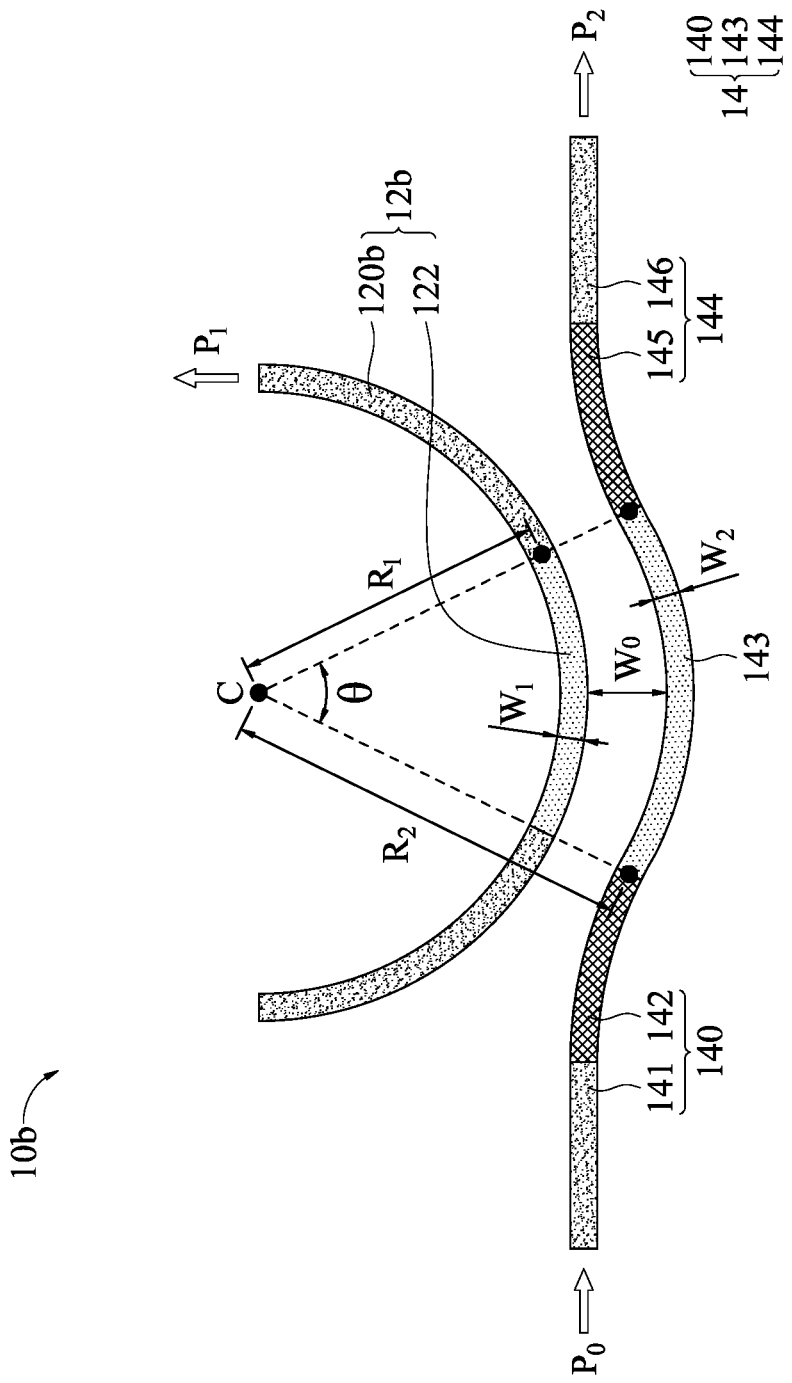
FIG. 3 illustrates a schematic top view of a simulation resonate element according to some embodiments.

Please refer to FIG. 1 and FIG. 3. FIG. 3 illustrates a schematic top view of a simulation resonate element 10b according to some embodiments. In some embodiments, configuration parameters of the broadband ring resonator 10a shown in FIG. 1 are obtained by simulating and adjusting the simulation resonate element 10b shown in FIG. 3 (which will be described later) in advance. Compared to the broadband ring resonator 10a shown in FIG. 1, components and configuration of the components of the simulation resonate element 10b shown in FIG. 3 are generally similar to those of the broadband ring resonator 10a shown in FIG. 1, and the difference between these embodiments is: the second waveguide 12b of FIG. 3 has a non-closed loop 120b; for example, the non-closed loop 120b may be, but not limited to, a semi-circular ring with a 180° opening angle, or an arc ring with other opening angle. The semi-circular first waveguide 12b shown in FIG. 3 is simply exemplarily described herein, which is not used to limit the invention to these specific embodiments. In FIG. 3, two ends of the second waveguide 14 are respectively an input port $P_0$ and a through port $P_2$ (or called a bar port), and the incident lights enter the second waveguide 14 from the input port $P_0$ and are partly or entirely output by the through port $P_2$. The first waveguide 12b is a semi-circular waveguide, and an end of the first waveguide 12b that is away from the input port $P_0$ of the second waveguide 14 is a coupled port $P_1$ (or called a cross port). When the first waveguide 12b and the second waveguide 14 are close enough to each other (that is, the coupling gap $W_0$ is narrow enough), the rest part of the incident lights will be coupled from the second waveguide 14 to the first waveguide 12b for a resonate condition between the first waveguide 12b and the second waveguide 14 is met, and thus the coupled incident lights are then output by the coupled port $P_1$. Hence, the total amount of the incident lights is the sum of the incident lights output by both the coupled port $P_1$ and the through port $P_2$.

In FIG. 1, since the first waveguide 12a is a closed loop 120a, photons originally coupled to the first waveguide 12b shown in FIG. 3 can still stay in the first waveguide 12a shown in FIG. 1. On the other hand, those photons coupled to the first waveguide 12a will result in optical losses of the photons due to staying in the first waveguide 12a for a longer time. In some embodiments, the optical losses can be defined by a quality factor that is obtained by practically measuring the optical transmission spectrum of the broadband ring resonator 10a. For example, the quality factor may be obtained by dividing the wavelength of the incident lights by the half width of the optical transmission spectrum corresponding to the wavelength of the incident lights. The higher the quality factor is, the relatively less the optical losses is, and the more easily the photons can be confined in the first waveguide 12a. Hence, the quality factor may be used to evaluate the quality of the broadband ring resonator 10a. In some embodiments, take a high-speed circular resonant modulator as an example of the broadband ring resonator 10a, the quality factor of the broadband ring resonator 10a obtained through the aforementioned simulation and adjustment may range from 5,000 to 10,000, such as at least about 7,000. More specifically, in some embodiments, the quality factor of the broadband ring resonator 10a corresponding to a broadband ranging from 1,300 nm to 1,320 nm (for example, 1,310 nm) is at least about 8,000. In some embodiments, the quality factor of the broadband ring resonator 10a can be further optimized by operating the broadband ring resonator 10a under a more suitable coupling condition, and thus the quality factor of the broadband ring resonator being of a million level can be further achieved.

Figure 4:
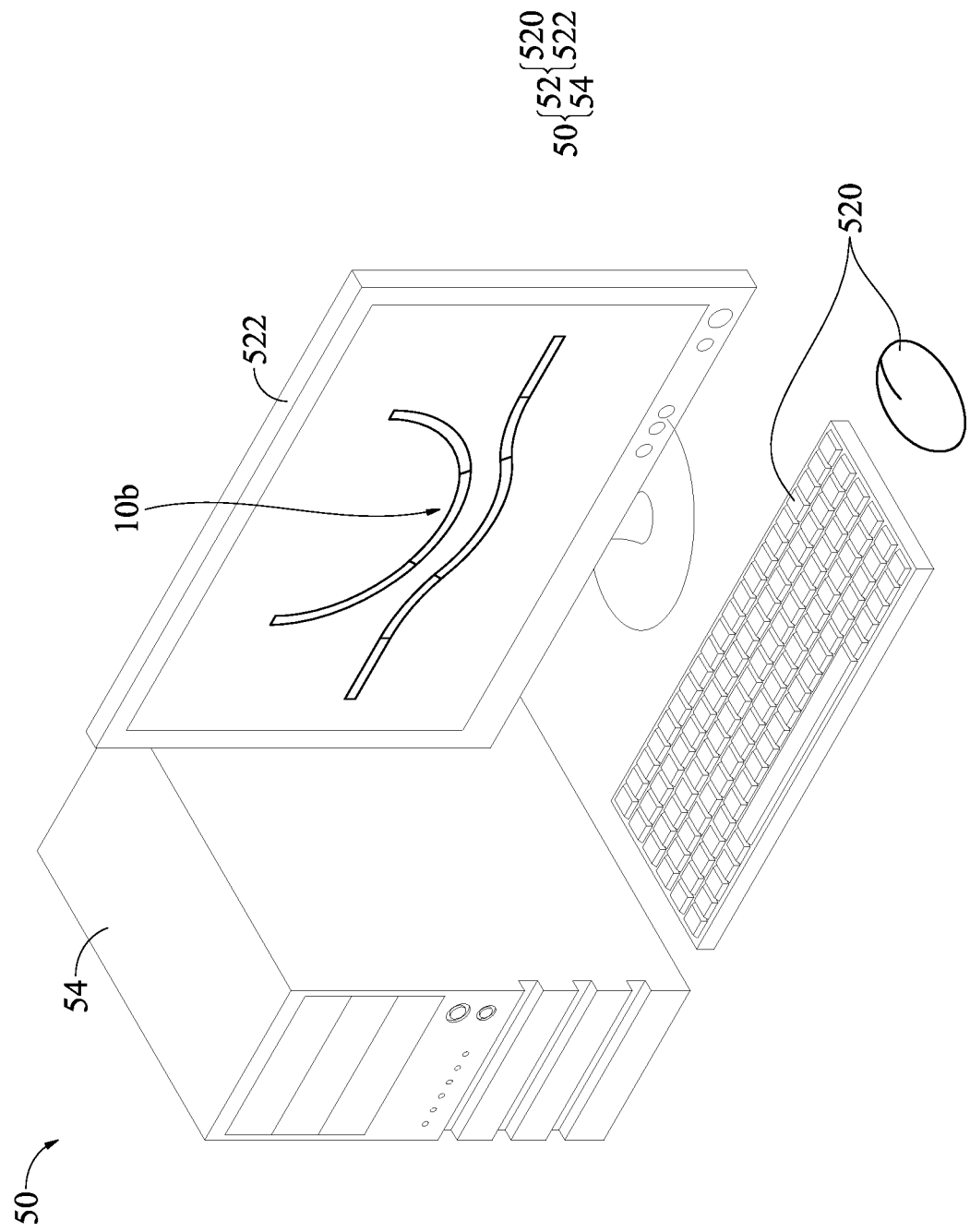
FIG. 4 illustrates a schematic view of a design system of the broadband ring resonator according to some embodiments.
Figure 5:
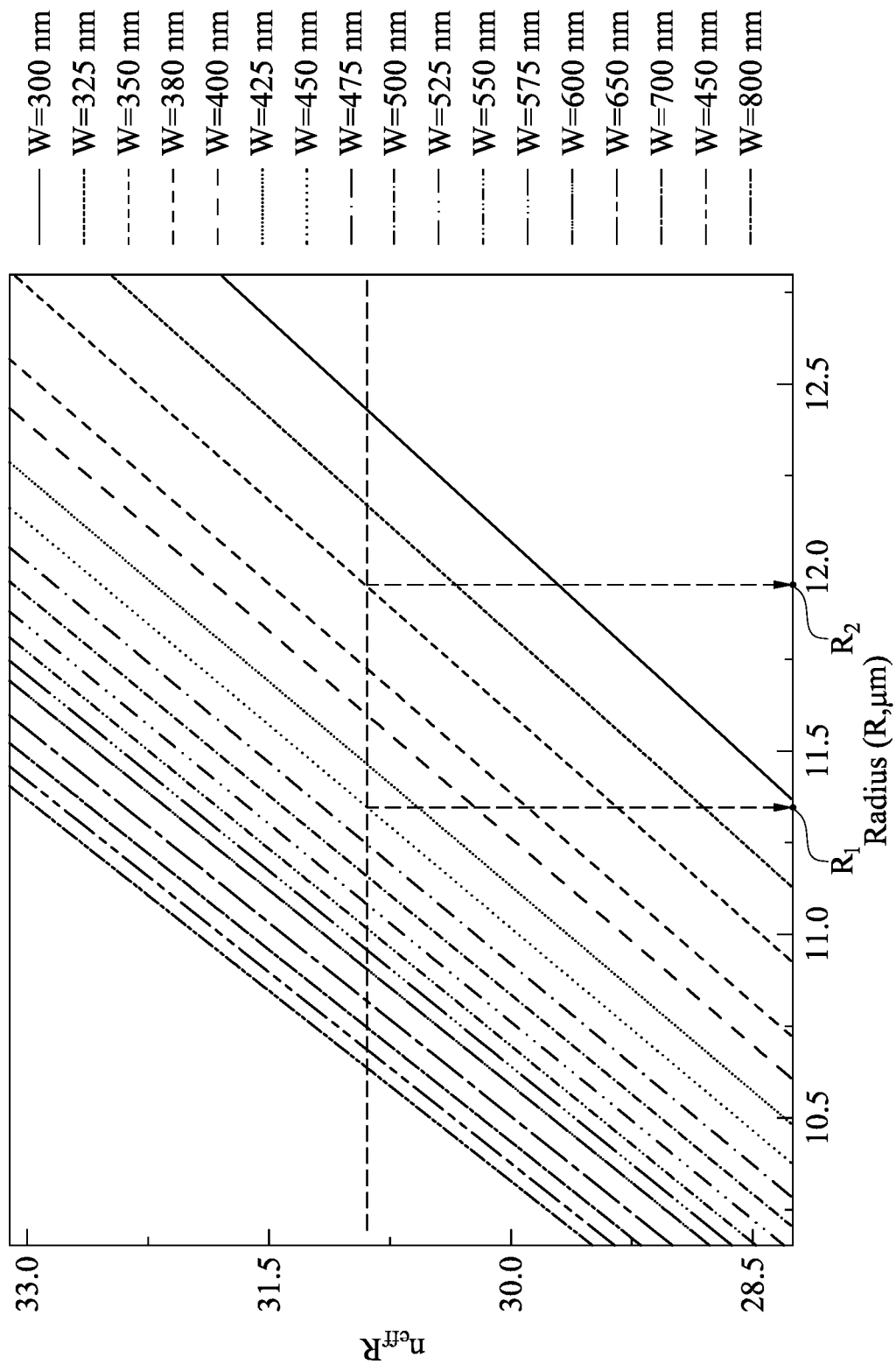
FIG. 5 illustrates a schematic graph showing a relation of radius and effective index of the design system of the broadband ring resonator according to some embodiments.

Please refer to FIG. 1 and FIG. 3 to FIG. 5 at the same time. FIG. 4 illustrates a schematic view of a design system 50 of the broadband ring resonator 10a according to some embodiments, and FIG. 5 illustrates a schematic graph showing a relation of radius and effective index of the design system 50 of the broadband ring resonator 10a according to some embodiments. In some embodiments, the configuration parameters of the broadband ring resonator 10a shown in FIG. 1 are obtained by simulating and adjusting the simulation resonate element 10b shown in FIG. 3 in advance by using a design system 50 (as shown in FIG. 4) of the broadband ring resonator 10a. In some embodiments, the design system 50 of the broadband ring resonator 10a comprises a user interface 52 and a processor 54 (as shown in FIG. 4). The user interface 52 comprises an input element 520 and a display element 522 (as shown in FIG. 4), and the input element 520 obtains a coupling gap $W_0$, a plurality of waveguide widths W (for example, the first width $W_1$ of the first waveguide 12b and/or the second width $W_2$ of the second waveguide 14), and a plurality of waveguide curvature radii R (for example, the first curvature radius $R_1$ of the first waveguide 12b and/or the second curvature radius $R_2$ of the second waveguide 14). The user interface 52 and the processor 54 are in communication with each other, and thus the interface 52 is in communication with the input element 520 and the display element 522.

In the step 1, the processor 54 obtains a relation of radius and effective index (or called a relation of radius-waveguide effective index ($n_{eff}$ R)) based on the coupling gap $W_0$, the waveguide widths W, and the waveguide curvature radii R. The relation of radius and effective index may be, for example but not limited to, a graph showing the relation of radius and effective index as shown in FIG. 5 and/or an equation of the relation of radius and effective index shown as Formula 1. The equation of the relation of radius and effective index shown as Formula 1 can be, for example, derived from an equation of the relation of radius and effective index shown as Formula 3. In Formula 1 and Formula 3, $n_{eff1}$ represents a first effective index, $n_{eff2}$ represents a second effective index, $R_1$ represents the first curvature radius, $R_2$ represents the second curvature radius, and d represents a tolerance (as shown in Formula 1), where the error threshold is not greater than 10%.

$$100\% = \frac{n_{eff1}}{n_{eff2}} \cdot \frac{R_1}{R_2} \pm d \quad \text{(Formula 1)}$$

$$n_{eff1} \cdot R_1 \approx n_{eff2} \cdot R_2 \quad \text{(Formula 3)}$$

Next, in the step 2, the processor 54 obtains the curvature radius and the width of the second coupling section 143 of the second waveguide 14 (that is, the second curvature radius $R_2$ and the second width $W_2$, respectively) according to the relation of radius and effective index of Formula 1 and the curvature radius and the width of the first coupling section 122 of the first waveguide 12b (that is, the first curvature radius $R_1$ and the first width $W_1$, respectively). Please refer to FIG. 5, the diagram of the relation of radius and effective index shown as FIG. 5 is obtained by plotting the relation between the radius-effective index ($n_{eff}$ R; that is, the vertical axis of FIG. 5) with respect to the waveguide curvature radii (R; that is, the horizontal axis of FIG. 5). Moreover, when the waveguide curvature radius R increases, a substantially positive-related linear relationship exists between the waveguide curvature radii R of each of the waveguide widths W and the corresponding radius-effective index $n_{eff}$ R.

In some embodiments, in the step 2-1, the processor 54 fixes the coupling gap $W_0$ and chooses a certain value of the radius-effective index $n_{eff}$ R to draw a dashed line based on the certain value of the radius-effective index $n_{eff}$ R and parallel to the horizontal axis of FIG. 5, so that a first width $W_1$ and a corresponding first curvature radius $R_1$ can be particularly obtained at an intersection of the dashed line and the curve of the certain first width $W_1$. Subsequently, in the step 2-2, the processor 54 further obtains a second width $W_2$ and a corresponding second curvature radius $R_2$ at an intersection of the same dashed line and the curve of a certain second width $W_2$.

For example, in FIG. 5, in the step 2-1, the processor 54 chooses and fixes a first radius-first effective index $n_{eff1}$ $R_1$, (about 30.75), and draws a dashed line parallel to the horizontal axis from a point of the vertical axis indicating 30.75. Subsequently, the processor 54 chooses one of the waveguide widths W as a first width $W_1$ and obtains a value of the horizontal axis of FIG. 5 (that is, the first curvature radius $R_1$ as shown in FIG. 5) corresponding to an intersection of the dashed line and the curve of the first width $W_1$. Subsequently, in the step 2-2, the processor 54 chooses one of the waveguide widths W as a second width $W_2$ and obtains a value of the horizontal axis of FIG. 5 (that is, the second curvature radius $R_2$ as shown in FIG. 5) corresponding to an intersection of the dashed line and the curve of the second width $W_3$.

Subsequently, in the step 2-3, the processor 54 back-calculates the obtained second curvature radius $R_2$ and the corresponding second effective index $n_{eff2}$ according to the obtained second curvature radius $R_2$ and Formula 3, so as to further obtain the second curvature radius $R_2$ at the left side of Formula 2 (which is called the second back-calculated curvature radius $R_2$' herein to distinguish from the aforementioned second curvature radius $R_2$) according to the second effective index $n_{eff2}$ and Formula 2.

Subsequently, in the step 2-4, the processor 54 obtains an error percentage DV of the second curvature radius $R_2$ and the second back-calculated curvature radius $R_2$' according to Formula 4. Subsequently, when the error percentage DV of Formula 4 is greater than the tolerance d of Formula 1, the processor 54 executes the step 2-2 to the step 2-4 again so as to choose another one from the waveguide widths W as a second width $W_2$. Alternatively, in some embodiments, in the step 2-5, when the error percentage DV of Formula 4 is not greater than (that is, less than or equal to) the tolerance d of Formula 1, the processor 54 outputs the coupling gap $W_0$, the first width $W_1$, the first curvature radius $R_1$, the second width $W_2$, and the second curvature radius $R_2$ correspondingly. In some embodiments, a ratio of the first width $W_1$ with respect to the second width $W_2$ ranges from 1.3 to 1.7, that is, $1.3 \leq W_1/W_2 \leq 1.7$. The tolerance d of Formula 1 can be further adjusted according to the process requirements and constraints; for example, the tolerance d of Formula 1 may be 10%; preferably, in some embodiments, 5%; more preferably, in some embodiments, 3%; yet more preferably, in some embodiments, 1%; still more preferably, in some embodiments, 0.5%.

$$DV = \frac{R_2 - R_2'}{R_2'} \quad \text{(Formula 4)}$$

For example, in the step 2-4 and the step 2-5, the tolerance d of Formula 1 is 1% or 0.5%, and configuration parameters that meet the requirements of the preset tolerance d are obtained by the processor 54 and listed in TABLE 1 below. In TABLE 1, the processor 54 further obtains a range of the error percentages DV that is processed by the processor 54 and meets the requirements of the preset tolerance d of Formula 1 by using Formula 4. For example, the error percentages DV range from −0.033% to 0.431% (that is, the range of the error percentages DV is from 0.033% to 0.431%, if an absolute value is taken), and all of them are less than the tolerance d of Formula 1 (that is, 1% or 0.5%).

TABLE 1

| No. | $W_0$ (nm) | $n_{eff1}$ | $R_1$ | $W_1$ (nm) | $R_1$ (μm) | $W_2$ (nm) | $R_2$ (μm) | $n_{eff2}$ | $R_2'$ (μm) | DV (%) |
|---|---|---|---|---|---|---|---|---|---|---|
| 1 | 200 | 30.336 | | 400 | 11.4 | 325 | 11.958 | 2.537 | 11.963 | 0.033 |
| 2 | | 30.754 | | 450 | 11.3 | 350 | 11.904 | 2.584 | 11.900 | −0.031 |
| 3 | | 28.870 | | 550 | 10.3 | 380 | 10.966 | 2.633 | 10.965 | −0.011 |
| 4 | | 35.228 | | 750 | 12.2 | 450 | 12.944 | 2.722 | 12.950 | 0.431 |

Figure 6A:
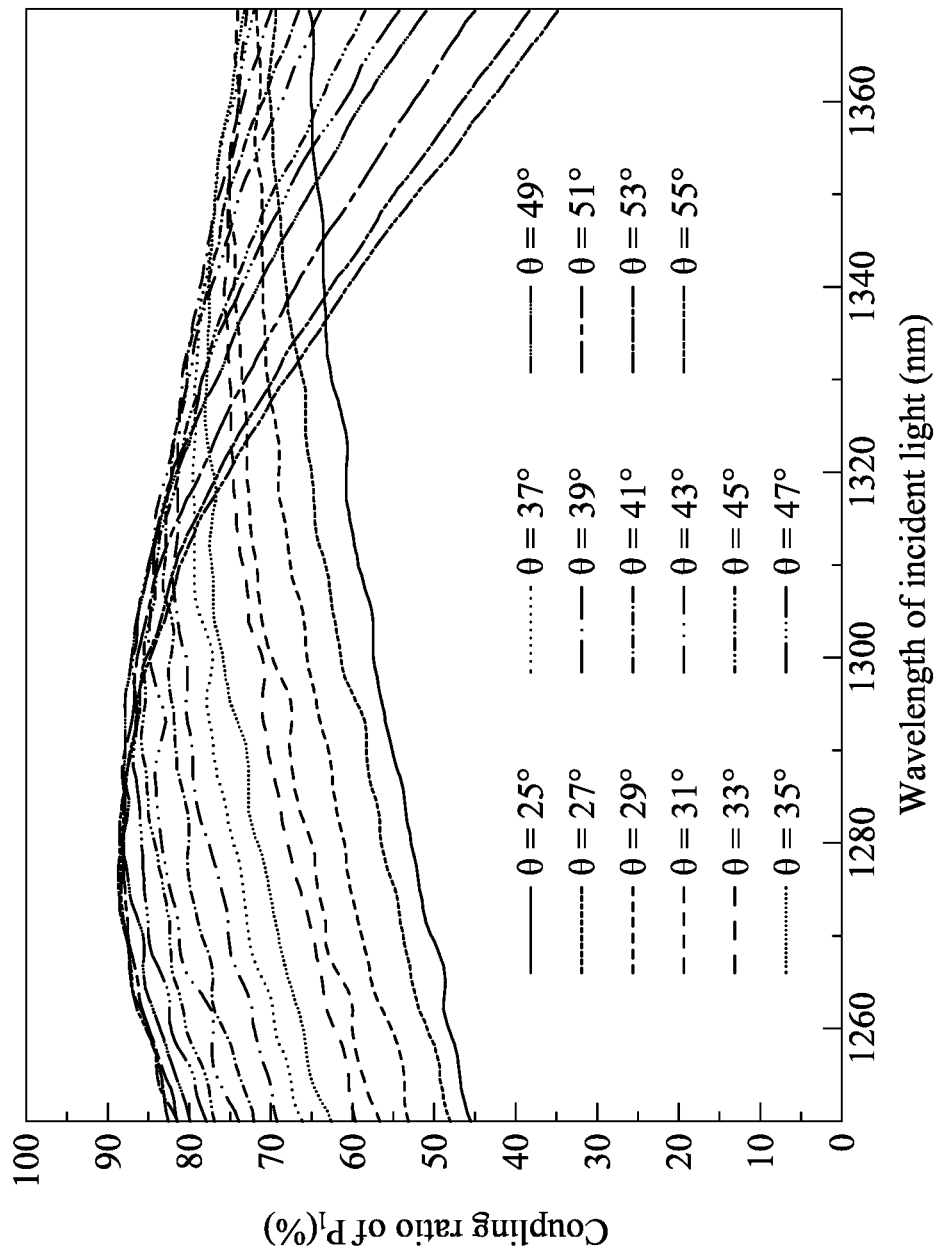
FIG. 6A illustrates a graph showing a simulated relationship of coupling ratios with respect to different coupling angles of the simulation resonate element according to some embodiments.

Next, in the step 3, the processor 54 adjusts the coupling angles θ of the first waveguide 12b and the second waveguide 14 (that is, indirectly adjust the coupling lengths; the coupling lengths may be for example the second curvature radius $R_2$ multiplying the coupling angle θ) to allow the couple ratios of the simulation resonate element 10b (including the first waveguide 12b and the second waveguide 14) in a broadband to be substantially approaching 100%. In some embodiments, the processor 54 adjusts the coupling angle θ of the first waveguide 12b and the coupling angle θ of the second waveguide 14 through simulating the directional coupler spectrum by 3D Finite-difference Time-domain (FDTD) Method or 3D Eigen Mode Expansion (EME) Method. Please refer to FIG. 6A. FIG. 6A illustrates a graph showing a simulated relationship of coupling ratios with respect to different coupling angles θ of the simulation resonate element 10b according to some embodiments. In FIG. 6A, the processor 54 obtains the coupling ratios of the coupled ports $P_1$ corresponding to the simulation resonate elements 10b (which is configured according to the configuration parameters, such as those listed in TABLE 2 below) in a specific band (corresponding to a wavelength section ranging from 1,250 nm to 1,350 nm, for example) by adjusting different coupling angles θ. With respect to different coupling angles θ, the coupling ratios of the coupled ports $P_1$ vary sinusoidally in a range between 0% and 100%. Hence, in some embodiments, the preferable coupling ratios of the coupled ports $P_1$ will occur in a specific band corresponding to the peak sections of the sinusoids. Accordingly, in some embodiments, through simulating and adjusting the coupling angles θ, the configuration parameters corresponding to preferable coupling ratios of the coupled ports $P_1$ (for example, substantially approaching 100%; or for example, the coupling ratios in FIG. 6A ranging from 0% to 90%, or preferably from 0% to 85% in some embodiments) can be obtained. The coupling ratios of the coupled ports $P_1$ can be further adjusted to be in an arbitrary range between 0% and 100% or adjusted to be any value in the arbitrary range by sequentially simulating and adjusting the configuration parameters.

TABLE 2

| $W_1$ (nm) | $R_1$ (μm) | $W_2$ (nm) | $R_2$ (μm) | $\frac{W_1}{W_2}$ | $W_0$ (nm) | θ (°) |
|---|---|---|---|---|---|---|
| 450 | 11.3 | 350 | 11.9000 | 1.286 | 200 | 25 |
| | | | | | | 27 |
| | | | | | | 29 |
| | | | | | | 31 |
| | | | | | | 33 |
| | | | | | | 35 |
| | | | | | | 37 |
| | | | | | | 39 |
| | | | | | | 41 |
| | | | | | | 43 |
| | | | | | | 45 |
| | | | | | | 47 |

TABLE 2-continued

| $W_1$ (nm) | $R_1$ (μm) | $W_2$ (nm) | $R_2$ (μm) | $\frac{W_1}{W_2}$ | $W_0$ (nm) | θ (°) |
|---|---|---|---|---|---|---|
| | | | | | | 49 |
| | | | | | | 51 |
| | | | | | | 53 |
| | | | | | | 55 |

Figure 6B:
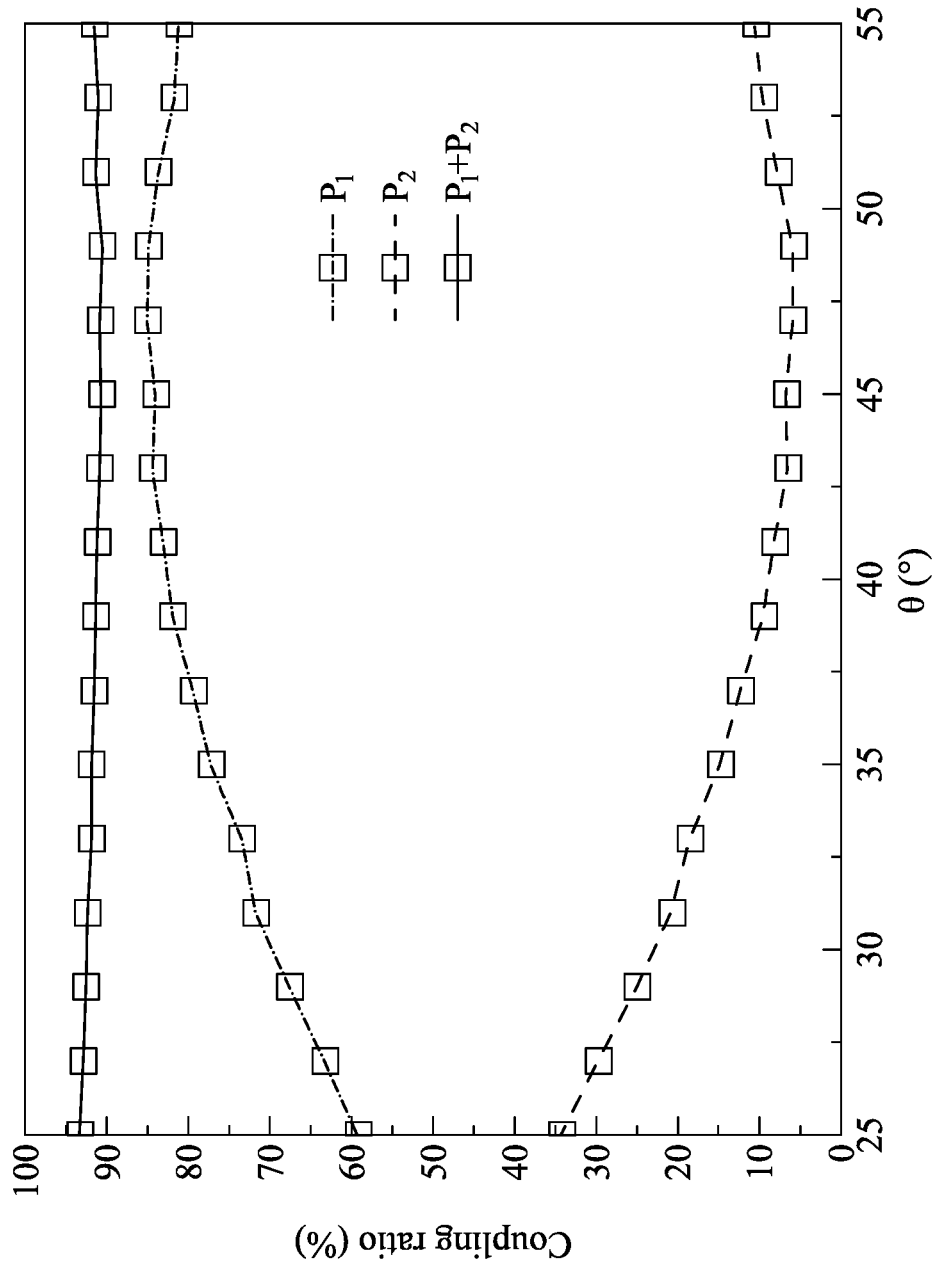
FIG. 6B illustrates a graph showing a simulated relationship of overall coupling ratios with respect to different coupling angles shown in FIG. 6A according to a first embodiment.
Figure 6C:
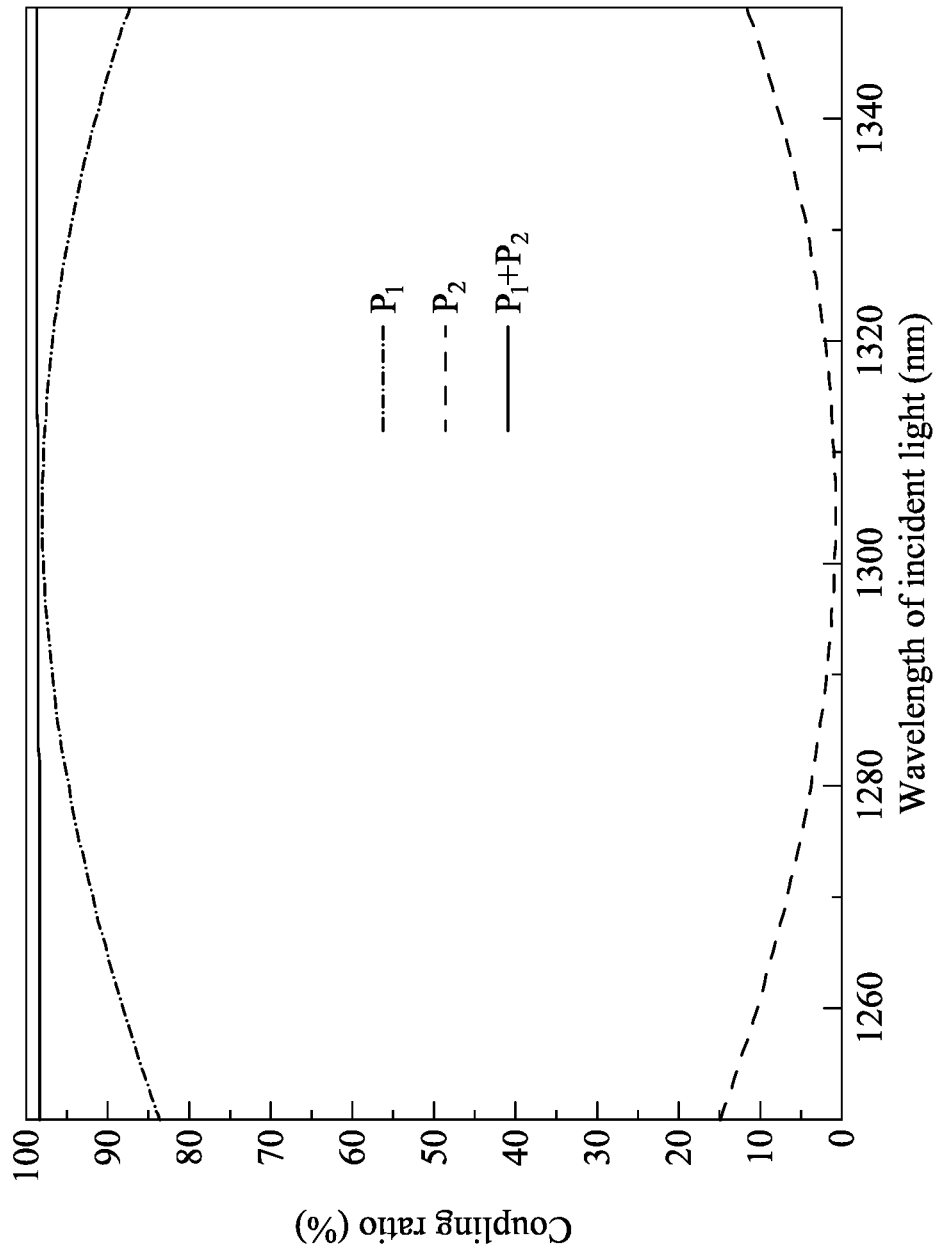
FIG. 6C illustrates a graph showing a simulated relationship of overall coupling ratios with respect to different coupling angles shown in FIG. 6A according to a second embodiment.

Please refer to FIG. 6A to FIG. 6C at the same time. FIG. 6B and FIG. 6C respectively illustrate graphs showing simulated relationships of overall coupling ratios with respect to different coupling angles θ shown in FIG. 6A according to a first embodiment and a second embodiment. FIG. 6B and FIG. 6C are obtained by using the processor 54 to perform a simulation according to the coupling ratios of the coupled ports $P_1$ shown in FIG. 6A, the coupling ratios of the through ports $P_2$ corresponding to the coupled ports $P_1$, and the overall coupling ratios (that is, $P_1+P_2$) corresponding to the coupled ports $P_1$, wherein FIG. 6B is illustrated by simulation with 10 grid points per wavelength (which is relatively less), and FIG. 6C is illustrated by simulation with 18 grid points per wavelength (which is relatively more). In FIG. 6B and FIG. 6C, compared to the coupling ratios of the coupled ports $P_1$ shown in FIG. 6C (simulated by more grid points per wavelength), slightly lower coupling ratios of the coupling ports $P_1$ are obtained in FIG. 6B (simulated by less grid points per wavelength). The reason is that, upon the simulation is performed through more grid points per wavelength, the subtle changes in the waveguide structure (including the first waveguide 12b and the second waveguide 14) can be relatively completely reflected, so that coupling ratios closer to theoretical values thus can be obtained. Take a coupling angle (θ=41°) shown in FIG. 6A to FIG. 6C as an example, the coupling angle (θ=41°) and the rest of the configuration parameters are matched with the configuration parameters shown in TABLE 2. Therefore, the simulation resonate elements 10b having the coupling ratios of the coupled ports $P_1$ that are substantially approaching 100% in a broadband (corresponding to a wavelength section ranging from 1,300 nm to 1,320 nm as shown in FIG. 6C; for example, 1,310 nm) are obtained. For example, the coupling ratios of the coupled ports $P_1$ range from 0% to 90%, or preferably, in some embodiments, from 0% to 85%, as shown in FIG. 6B; or for example, the coupling ratios of the coupled ports $P_1$ range from 80% to 100%, or preferably, in some embodiments, from 85% to 100%, as shown in FIG. 6C.

Next, in the step 4, the processor 54 adjusts at least one of the configuration parameters (including the first curvature radius $R_1$, the first width $W_1$, the second curvature radius $R_2$, the second width $W_2$, the coupling gap $W_0$, and the coupling angle θ) based on the configuration parameters (including the first curvature radius $R_1$, the first width $W_1$, the second curvature radius $R_2$, the second width $W_2$, the coupling gap $W_0$, and the coupling angle θ) obtained by the step 3 so as to allow the adjusted coupling ratios of the simulation resonate element 10b in a part of the broadband to be in a range between 0% and 100%. In some embodiments, a ratio of the first width $W_1$ with respect to the second width $W_2$ is from 1.3 to 1.7.

Next, in the step 5, the processor 54 outputs the adjusted coupling ratios and the corresponding configuration parameters (that is, the first curvature radius $R_1$, the first width $W_1$, the second curvature radius $R_2$, the second width $W_2$, the coupling gap $W_0$, and the coupling angle θ). The output configuration parameters may be an allowed range, such as the allowed range of the output first width $W_1$ may be from 470 nm to 600 nm, or the allowed range of the output coupling gap $W_0$ may be from 150 nm to 250 nm. The obtained configuration parameters here are the configuration parameters that are substantially matched to each other. For example, the coupling gaps $W_0$ are narrow enough yet not too narrow to result in difficulties of fabrication; or for example, the coupling angles θ are large enough and correspond to the coupling lengths (for example, the second curvature radius $R_2$ multiplying the coupling angle θ) that are long enough to substantially meet or approach the matching condition in a broadband. Accordingly, the first coupling section 122 of the first waveguide 12b and the second coupling section 143 of the second waveguide 14 configured according to the substantially-matched configuration parameters are the first coupling section 122 and second coupling section 143 that are substantially matched to each other.

Figure 7A:
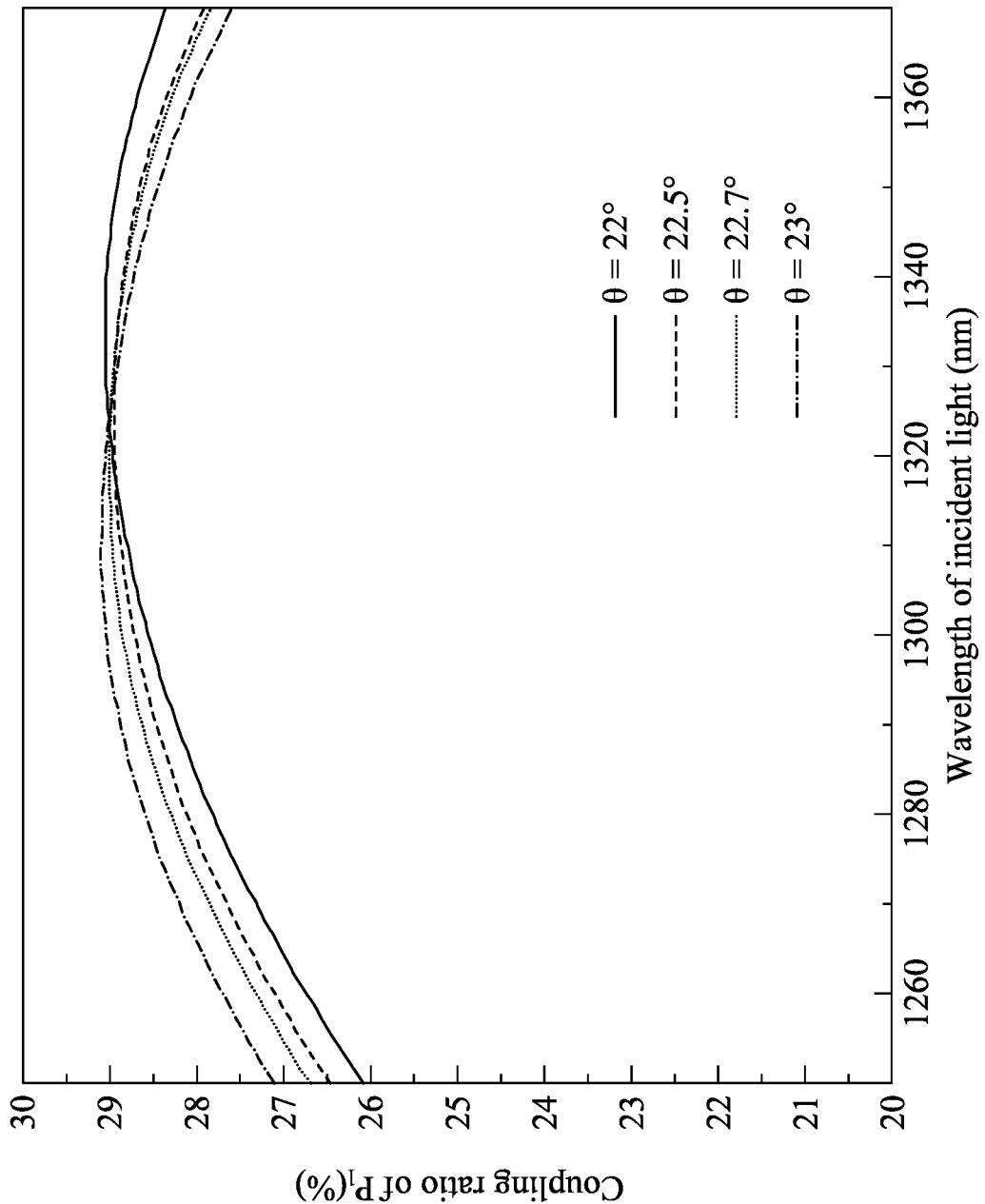
FIG. 7A illustrates a graph showing a simulated relationship of coupling ratios with respect to different coupling angles of the simulation resonate element (with the first width fixed; $W_1$=500 nm) in a broadband according to some embodiments.
Figure 8A:
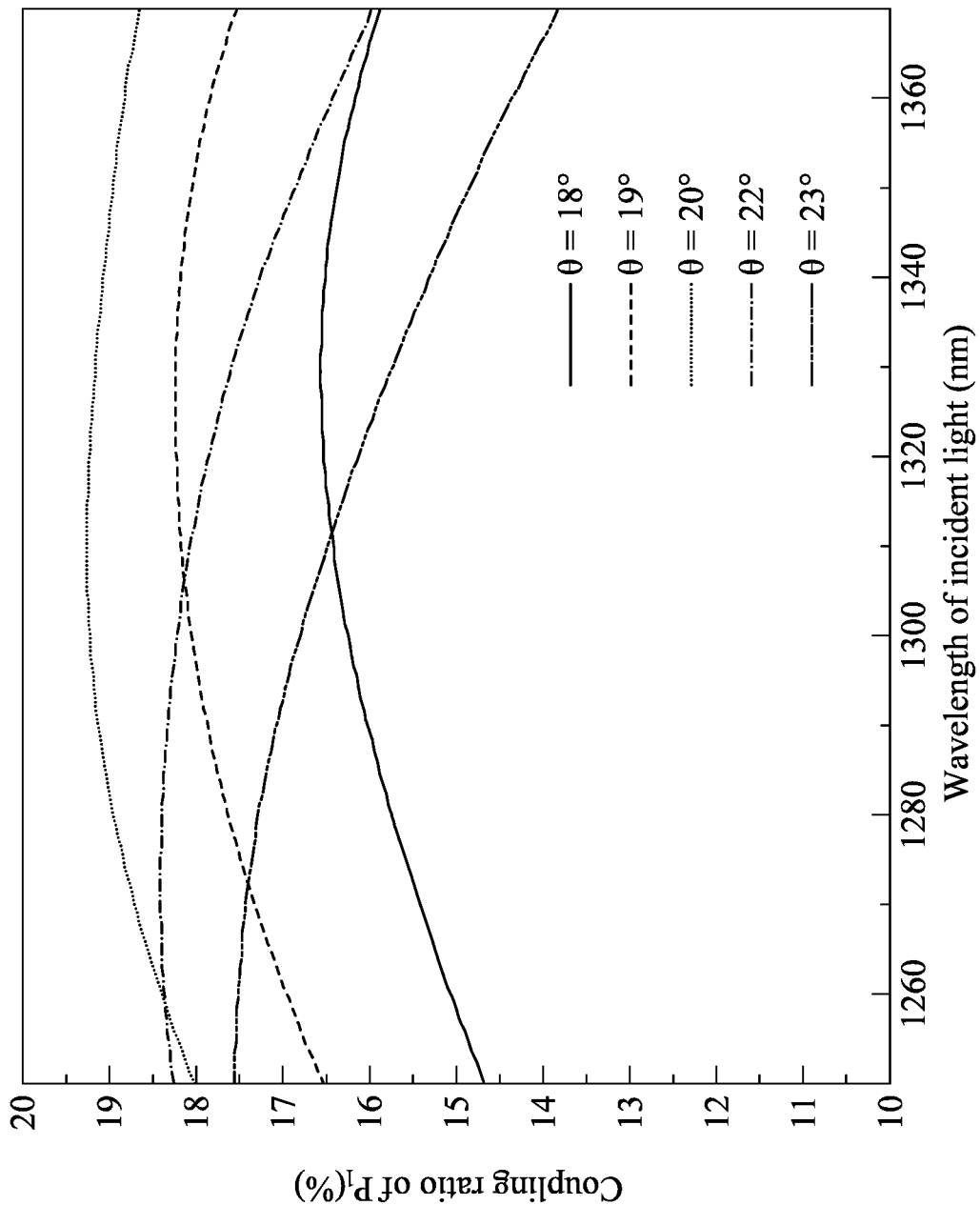
FIG. 8A illustrates a graph showing a simulated relationship of coupling ratios with respect to different coupling angles of the simulation resonate element (with the first width fixed; $W_1$=525 nm) in a broadband according to some embodiments.
Figure 9A:
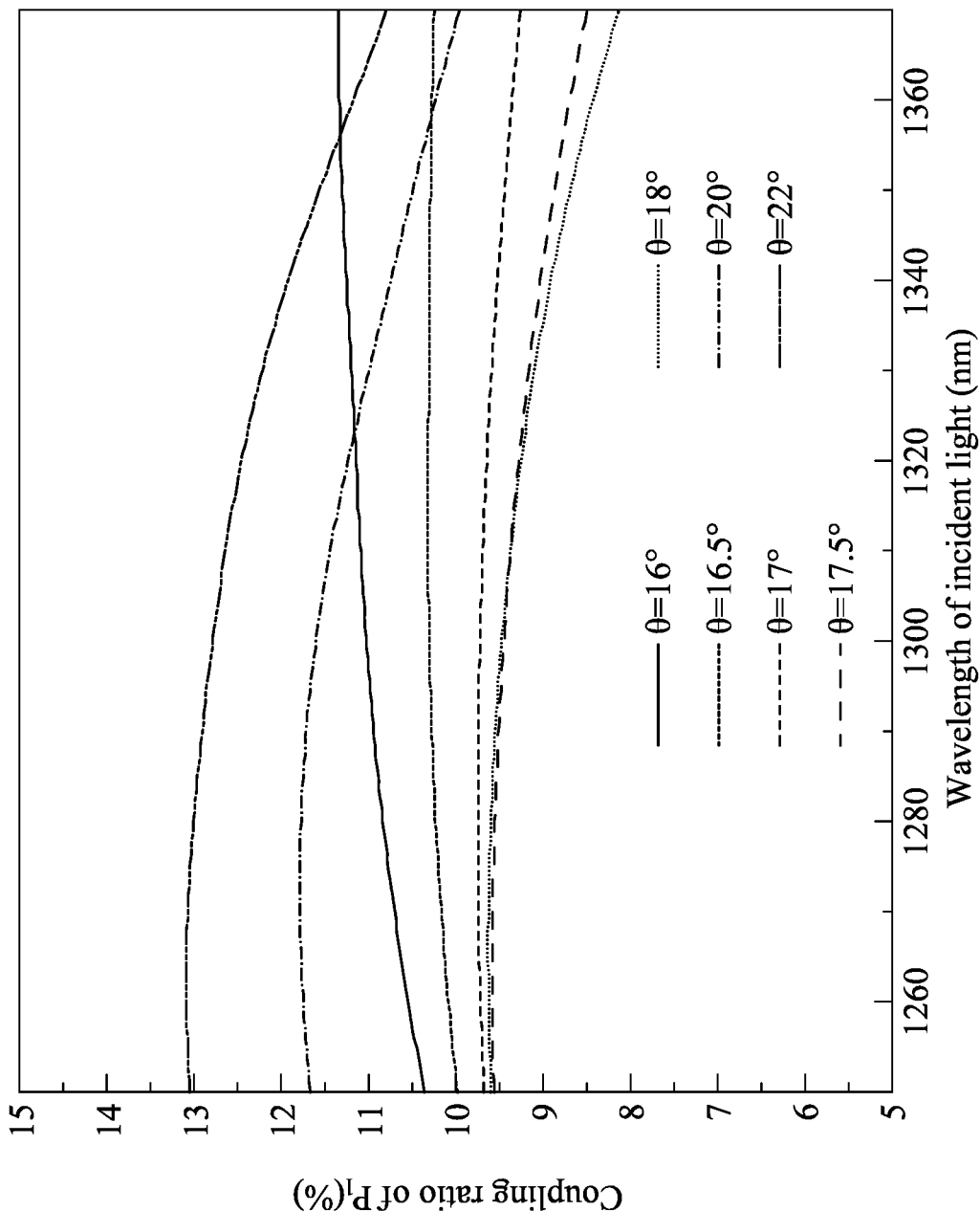
FIG. 9A illustrates a graph showing a simulated relationship of coupling ratios with respect to different coupling angles of the simulation resonate element (with the first width fixed; $W_1$=550 nm) in a broadband according to some embodiments.

Please refer to FIG. 7A, FIG. 8A, and FIG. 9A. FIG. 7A, FIG. 8A, and FIG. 9A respectively illustrate graphs showing simulated relationships of coupling ratios with respect to different coupling angles θ of the simulation resonate elements 10b (with the first widths $W_1$ fixed; $W_1$=500 nm/525 nm/550 nm) in a broadband according to some embodiments. In FIG. 7A, FIG. 8A, and FIG. 9A, in the step 4, the processor 54 simply adjusts different first widths $W_1$ (with other configuration parameters fixed; the configuration parameters of FIG. 7A are taken as an example, and the specific configuration parameters of FIG. 7A are listed in TABLE 3 below) based on the configuration parameters obtained by the step 3 so as to further allow the adjusted coupling ratios of the simulation resonate element 10b in a specific broadband (corresponding to a wavelength section ranging from 1,250 nm to 1,370 nm as shown in FIG. 7A) to be in a range from 0% to 85%.

TABLE 3

| $W_1$ (nm) | $R_1$ (μm) | $W_2$ (nm) | $R_2$ (μm) | $\frac{W_1}{W_2}$ | $W_0$ (nm) | θ (°) |
|---|---|---|---|---|---|---|
| 500 | 11.3 | 350 | 11.9250 | 1.429 | 200 | 22.0 |
| | | | | | | 22.5 |
| | | | | | | 22.7 |
| | | | | | | 23.0 |

In the configuration parameters, since the coupling gap $W_0$ is fixed, if the first width $W_1$ is adjusted by a width adjustment (for example, the first width $W_1$ is increased from 450 nm to 500 nm), it means that, for example, the first width $W_1$ is increased by half of the width adjustment along a direction toward the center C of the first waveguide 12b (as shown in FIG. 3); meanwhile, the first width $W_1$ is also increased by half of the width adjustment along a direction away from the center C of the first waveguide 12b (as shown in FIG. 3). Hence, to fix the coupling gap $W_0$ and the second width $W_2$, the second curvature radius $R_2$ of the second waveguide 14 also has to be increased by half of the width adjustment along a direction away from the center C of the first waveguide 12b (as shown in FIG. 3); and vice versa. Specifically, take the configuration parameters shown in TABLE 2 and TABLE 3 as an example. Compared to the first width ($W_1$=450 nm) in TABLE 2, the first width $W_1$ in TABLE 3 is increased to 500 nm. Therefore, the second curvature radius $R_2$ in TABLE 3 also has to be increased by half of the width adjustment (the width adjustment is 50 nm, and thus half of the width adjustment is 25 nm (0.025 μm)) along a direction away from the center C of the first waveguide 12b (as shown in FIG. 3), and thus the increased second curvature radius $R_2$ in TABLE 3 is obtained (the second curvature radius $R_2$ is supposed to be 11.9250 μm).

Please refer to FIG. 7A again. In FIG. 7A, in the step 4, the processor 54 simply adjusts different first widths $W_1$ and coupling angles θ (with other configuration parameters fixed; the specific configuration parameters are listed in TABLE 3 above) based on the configuration parameters obtained by the step 3, so as to further allow the adjusted coupling ratios of the simulation resonate element 10b in a specific broadband (corresponding to a wavelength section ranging from 1,250 nm to 1,370 nm) to be in a range between 25% and 30%. In FIG. 7A, the processor 54 chooses the configuration parameters (including the first width $W_1$) in advance, and then simply adjust the coupling angles θ. Therefore, the processor 54 substantially adjusts at least two of the configuration parameters (including the first width $W_1$ and the coupling angle θ). Please refer to FIG. 6C and FIG. 7A at the same time. Take the coupling ratios of the coupled ports $P_1$ with different first widths $W_1$ in FIG. 6C as an example, where the coupling ratios are from about 80% to about 100%. Compared to those of FIG. 6C, the coupling ratios of the coupled ports $P_1$ with different first widths $W_1$ in FIG. 7A (that is, the coupling ratios are from about 25% to about 30%) are adjusted by the processor 54 and decreased by about 50% to about 75% to an arbitrary range between 0% and 100% or any value in the arbitrary range.

Figure 7B:
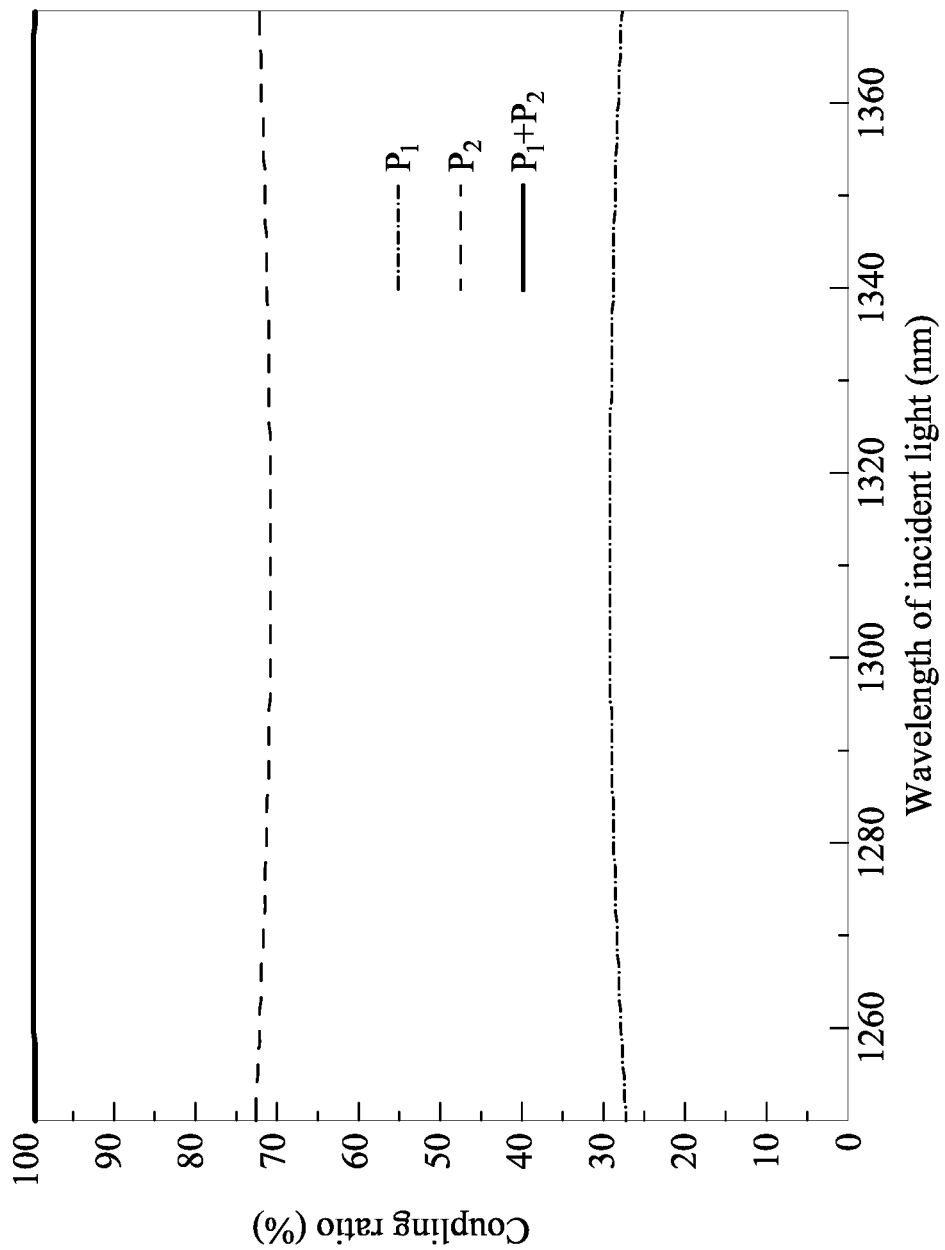
FIG. 7B illustrates a graph showing a simulated relationship of coupling ratios with respect to the simulation resonate element configured according to the configuration parameters shown in FIG. 7A (with the coupling angle fixed; θ=23°) in a broadband.

Please refer to FIG. 7B. FIG. 7B illustrates a graph showing a simulated relationship of coupling ratios with respect to the simulation resonate element 10b configured according to the configuration parameters shown in FIG. 7A (with the coupling angle θ fixed; θ=23°) in a broadband.

More specifically, FIG. 7B is obtained through the simulation based on the coupling ratios of the coupled ports $P_1$ with the coupling angle θ=23° shown in FIG. 7A, the coupling ratios of the through ports $P_2$ corresponding to the coupled ports $P_1$, and the overall coupling ratios ($P_1+P_2$) corresponding to the coupled ports $P_1$. In FIG. 7B, the coupling ratios of the simulation resonate element 10b in a specific broadband (corresponding to a wavelength section ranging from 1,250 nm to 1,370 nm) all range between 25% and 30%; more precisely, in some embodiments, 28%±1%.

Please refer to FIG. 8A. FIG. 8A illustrates a graph showing a simulated relationship of coupling ratios with respect to different coupling angles θ of the simulation resonate element 10b (with the first width $W_1$ fixed; $W_1$=525 nm) in a broadband according to some embodiments. In FIG. 8A, in the step 4, the processor 54 simply adjusts different first widths $W_1$ and coupling angles θ (with other configuration parameters fixed; the specific configuration parameters are listed in TABLE 4 below) based on the configuration parameters obtained from the step 3, so as to further allow the adjusted coupling ratios of the simulation resonate element 10b in a specific broadband (corresponding to a wavelength section ranging from 1,250 nm to 1,370 nm) to be in a range between 13% and 20%. In this embodiment, as mentioned above, the processor 54 also substantially adjusts at least two of the configuration parameters (including the first width $W_1$ and the coupling angle θ). Please refer to FIG. 6C and FIG. 8A at the same time. Take the coupling ratios of the coupled ports $P_1$ with different first widths $W_1$ in FIG. 6C as an example, where the coupling ratios are from about 80% to about 100%. Compared to those of FIG. 6C, the coupling ratios of the coupled ports $P_1$ with different first widths $W_1$ in FIG. 8A (that is, the coupling ratios are from about 13% to about 20%) are adjusted by the processor 54 and decreased by about 60% to about 87% to an arbitrary range between 0% and 100% or any value in the arbitrary range.

TABLE 4

| $W_1$ (nm) | $R_1$ (μm) | $W_2$ (nm) | $R_2$ (μm) | $\frac{W_1}{W_2}$ | $W_0$ (nm) | θ (°) |
|---|---|---|---|---|---|---|
| 525 | 11.3 | 350 | 11.9375 | 1.500 | 200 | 18.0 |
|  |  |  |  |  |  | 19.0 |
|  |  |  |  |  |  | 20.0 |
|  |  |  |  |  |  | 22.0 |
|  |  |  |  |  |  | 23.0 |

Figure 8B:
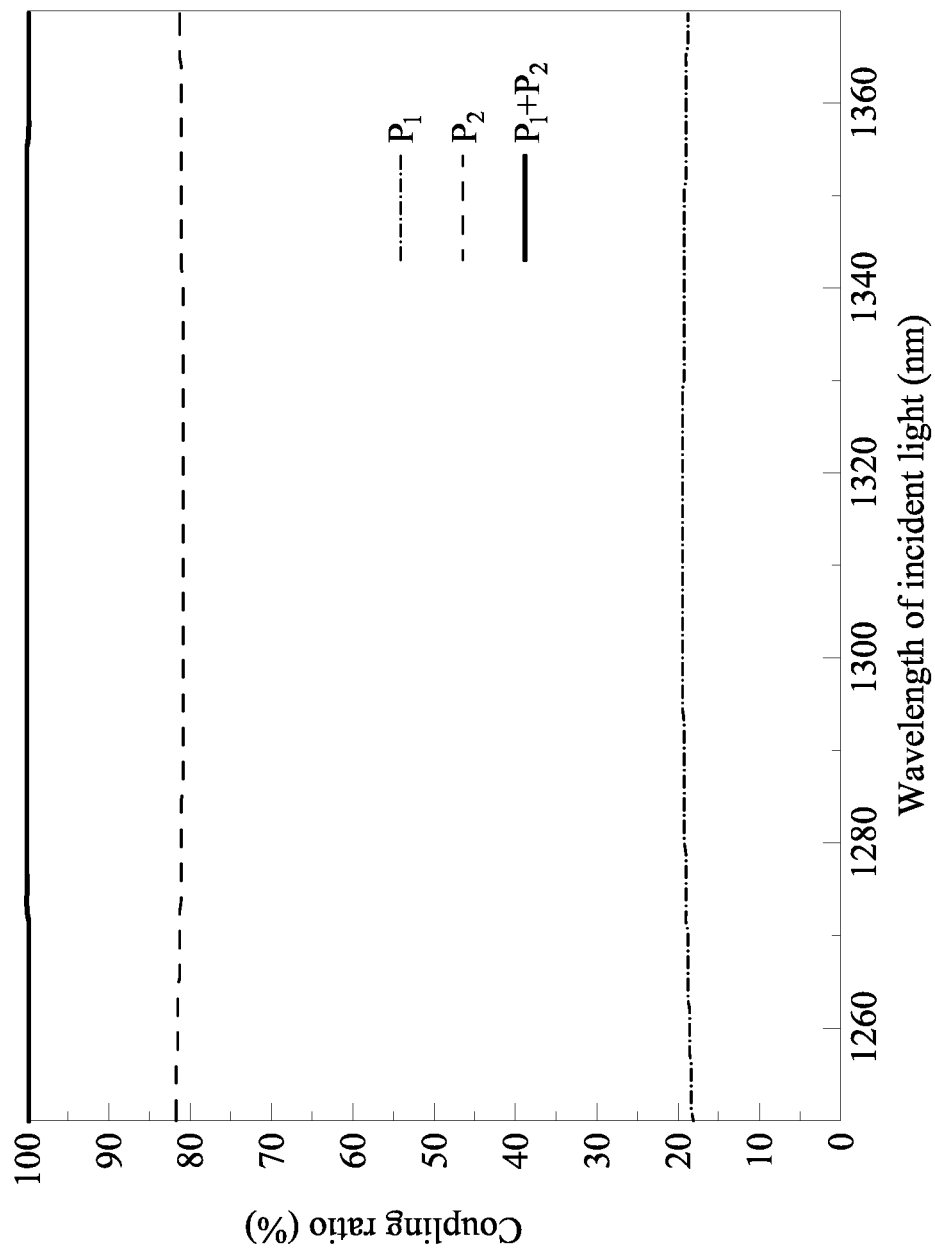
FIG. 8B illustrates a graph showing a simulated relationship of coupling ratios with respect to the simulation resonate element configured according to the configuration parameters shown in FIG. 8A (with the coupling angle fixed; θ=20°) in a broadband.

Please refer to FIG. 8B. FIG. 8B illustrates a graph showing a simulated relationship of coupling ratios with respect to the simulation resonate element 10b configured according to the configuration parameters shown in FIG. 8A (with the coupling angle θ fixed; θ=20°) in a broadband. More specifically, FIG. 8B is obtained through the simulation based on the coupling ratios of the coupled ports $P_1$ with the coupling angle θ=20° shown in FIG. 8A, the coupling ratios of the through ports $P_2$ corresponding to the coupled ports $P_1$, and the overall coupling ratios ($P_1+P_2$) corresponding to the coupled ports $P_1$. In FIG. 8B, the coupling ratios of the simulation resonate element 10b in a specific broadband (corresponding to a wavelength section ranging from 1,250 nm to 1,370 nm) all range between 13% and 20%; more precisely, in some embodiments, 19%±1%.

Please refer to FIG. 9A. FIG. 9A illustrates a graph showing a simulated relationship of coupling ratios with respect to different coupling angles θ of the simulation resonate element 10b (with the first width $W_1$ fixed; $W_1$=550 nm) in a broadband according to some embodiments. In FIG. 9A, in the step 4, the processor 54 simply adjusts different first widths $W_1$ and coupling angles θ (with other configuration parameters fixed; the specific configuration parameters are listed in TABLE 5 below) based on the configuration parameters obtained from the step 3, so as to further allow the adjusted coupling ratios of the simulation resonate element 10b in a specific broadband (corresponding to a wavelength section ranging from 1,250 nm to 1,370 nm) to be in a range between 7% and 14%. In this embodiment, as mentioned above, the processor 54 also substantially adjusts at least two of the configuration parameters (including the first width $W_1$ and the coupling angle θ). Please refer to FIG. 6C and FIG. 9A at the same time. Take the coupling ratios of the coupled ports $P_1$ with different first widths $W_1$ in FIG. 6C as an example, where the coupling ratios are from about 80% to about 100%. Compared to those of FIG. 6C, the coupling ratios of the coupled ports $P_1$ with different first widths $W_1$ in FIG. 9A (that is, the coupling ratios are from about 7% to about 14%) are adjusted by the processor 54 and decreased by about 66% to about 93% to an arbitrary range between 0% and 100% or any value in the arbitrary range.

TABLE 5

| $W_1$ (nm) | $R_1$ (μm) | $W_2$ (nm) | $R_2$ (μm) | $\frac{W_1}{W_2}$ | $W_0$ (nm) | θ (°) |
|---|---|---|---|---|---|---|
| 550 | 11.3 | 350 | 11.9500 | 1.571 | 200 | 16.0 |
|  |  |  |  |  |  | 16.5 |
|  |  |  |  |  |  | 17.0 |
|  |  |  |  |  |  | 17.5 |
|  |  |  |  |  |  | 18.0 |
|  |  |  |  |  |  | 20.0 |
|  |  |  |  |  |  | 22.0 |

Figure 9B:
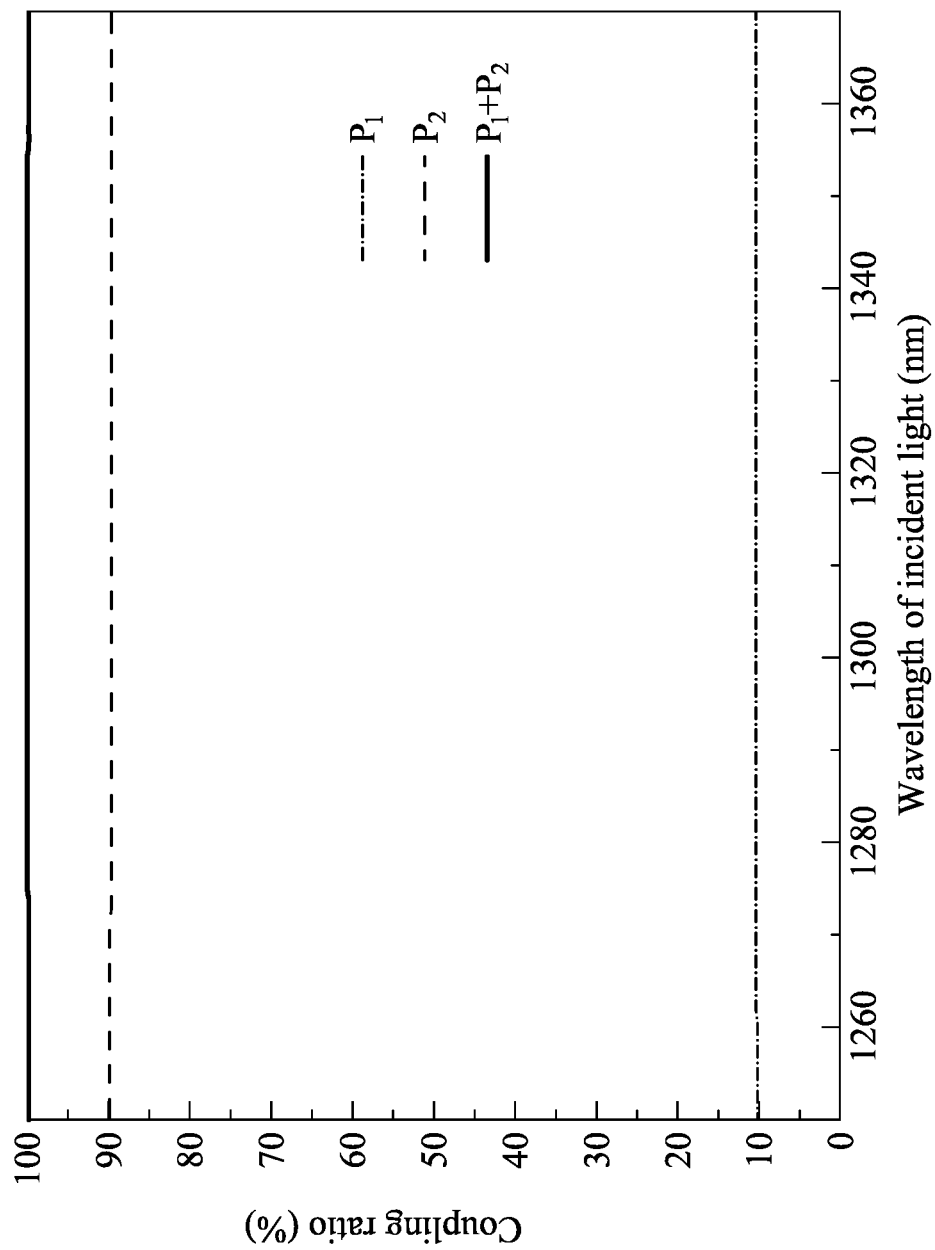
FIG. 9B illustrates a graph showing a simulated relationship of coupling ratios with respect to the simulation resonate element configured according to the configuration parameters shown in FIG. 9A (with the coupling angle fixed; θ=16.5°) in a broadband.

Please refer to FIG. 9B. FIG. 9B illustrates a graph showing a simulated relationship of coupling ratios with respect to the simulation resonate element 10b configured according to the configuration parameters shown in FIG. 9A (with the coupling angle θ fixed; θ=16.5°) in a broadband. More specifically, FIG. 9B is obtained through the simulation based on the coupling ratios of the coupled ports $P_1$ with the coupling angle θ=16.5° shown in FIG. 9A, the coupling ratios of the through ports $P_2$ corresponding to the coupled ports $P_1$, and the overall coupling ratios ($P_1+P_2$) corresponding to the coupled ports $P_1$. In FIG. 9B, the coupling ratios of the simulation resonate element 10b in a specific broadband (corresponding to a wavelength section ranging from 1,250 nm to 1,370 nm) all range between 7% and 14%; more precisely, in some embodiments, 10%±0.5%.

Next, the display element 522 receives the output configuration parameters output by the processor 54 in the step 5 (including the first curvature radius $R_1$, the first width $W_1$, the second curvature radius $R_2$, the second width $W_2$, the coupling gap $W_0$, and the coupling angle θ) to further output the configuration parameters (including the first curvature radius $R_1$, the first width $W_1$, the second curvature radius $R_2$, the second width $W_2$, the coupling gap $W_0$, and the coupling angle θ) and the adjusted coupling ratios. Accordingly, based on the output configuration parameters, two ends of the semi-circular first waveguide 12b of the simulation resonate element 10b shown in FIG. 3 are further connected to each other to obtain the first waveguide 12a having a closed loop 120a of the broadband ring resonator 10a shown in FIG. 1. Hence, the broadband ring resonator 10a according to some embodiments can thus exhibit a high uniformity of several optical output performances (such as high uniform resonant dips and optical losses) and relatively higher quality factors.

Figure 10:
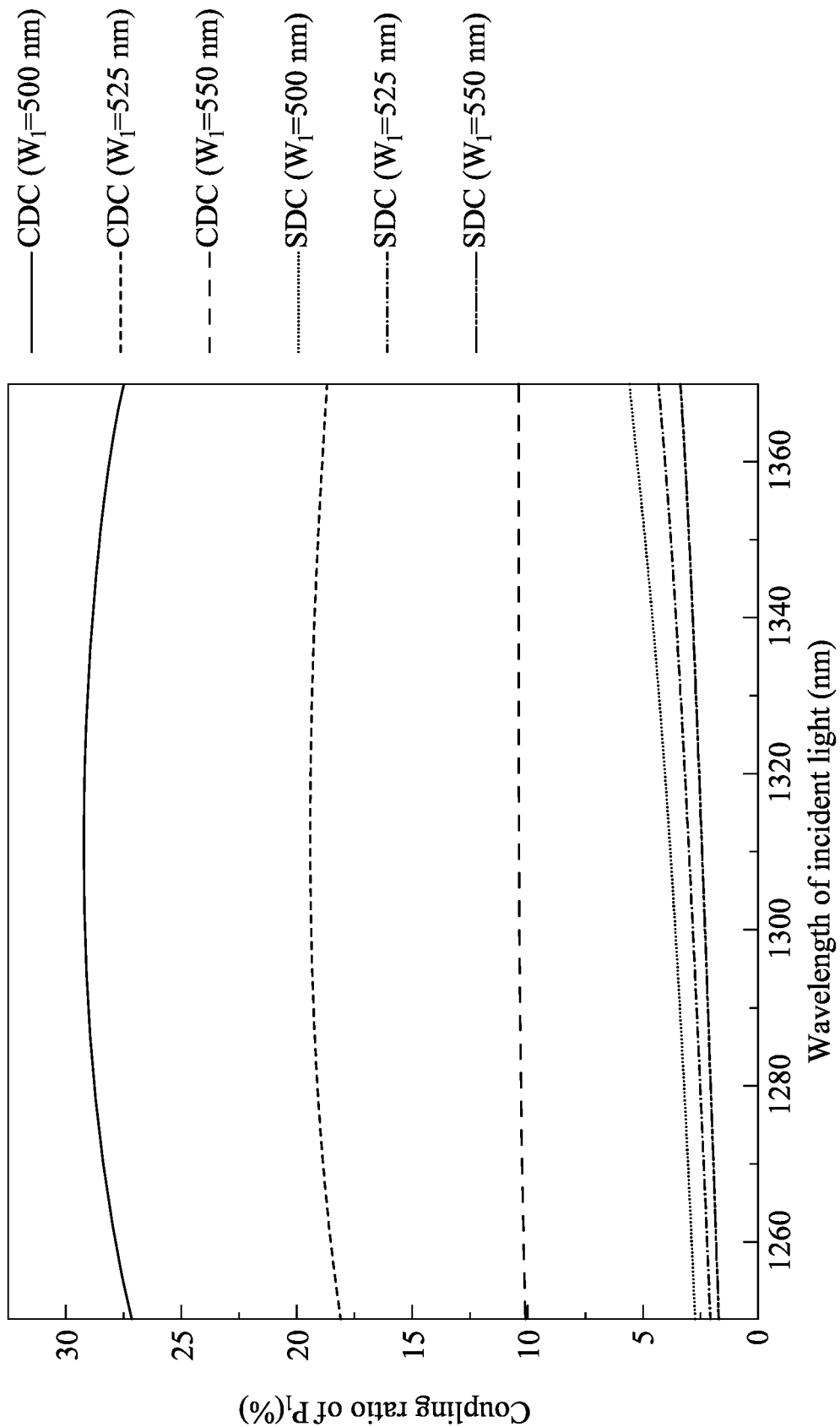
FIG. 10 illustrates a graph showing a simulated relationship of coupling ratios with respect to an optical coupling section of a simulation resonate element with different first widths and an optical coupling section of a resonate element having a long straight second waveguide in a broadband with different first widths according to some embodiments.

Please refer to FIG. 10. FIG. 10 illustrates a graph showing a simulated relationship of coupling ratios with respect to an optical coupling section of a simulation resonate element 10b with different first widths $W_1$ and an optical coupling section of a resonate element having a long straight second waveguide in a broadband with different first widths $W_1$ according to some embodiments. In FIG. 10, the term "CDC (curved directional coupler)" is used to represent an optical coupling section (that is, the first coupling section 122 and the second coupling section 143) of the simulation resonate element 10b shown in FIG. 3. On the other hand, the term "SDC (straight directional coupler)" is used to represent an optical coupling section (corresponding to the first coupling section 122 and the second coupling section 143 shown in FIG. 3) of a resonate element having a long straight second waveguide (which replaces the curved second waveguide 14 of the simulation resonate element 10b shown in FIG. 3). Both the CDCs and the SDCs are configured according to the configuration parameters shown in FIG. 7B, FIG. 8B, and FIG. 9B (and listed in TABLE 6 below). It is noted that the second waveguides of the SDCs are long and straight, and the second curvature radii $R_2$ of the SDC thus refer to the shortest distance between the second coupling section 143 (as shown in FIG. 3) and the center C. In FIG. 10, as for the CDCs and the SDCs configured according to the configuration parameters shown in FIG. 7B (with $W_1$=500 nm; denoted as the first group), the coupling ratios of the coupled ports $P_1$ of the CDCs are from about 25% to about 30%, while the corresponding coupling ratios of the SDCs are from about 2.5% to about 5%. Accordingly, the coupling ratios of the coupled ports $P_1$ of the CDCs are apparently higher than those of the SDCs. Likewise, the similar situations can be found in the CDCs and the SDCs according to both the configuration parameters shown in FIG. 8B and FIG. 9B (denoted as the second group and the third group, respectively). In other words, as for the CDCs and the SDCs in the second group and the third group, the coupling ratios of the coupled ports $P_1$ of the CDCs are respectively from about 17.5% to about 20% and from about 10% to about 12.5%, while the corresponding coupling ratios of the SDCs are respectively from about 1% to about 4% and about from about 1% to about 3%. Accordingly, the coupling ratios of the coupled ports $P_1$ of the CDCs (having curved second waveguides 14) are apparently higher than those of the SDCs (having long straight second waveguides); that is, configurations of the CDCs indeed enable more incident lights to be coupled from the second waveguides 14 to the first waveguides 12b.

TABLE 6

| Corresponding Figures | Types | $W_1$ (nm) | $R_1$ (μm) | $W_2$ (nm) | $R_2$ (μm) | $\frac{W_1}{W_2}$ | $W_0$ (nm) | θ (°) |
|---|---|---|---|---|---|---|---|---|
| FIG. 7B | CDC/SDC | 500 | 11.3 | 350 | 11.9250 | 1.429 | 200 | 23.0 |
| FIG. 8B | CDC/SDC | 525 | | | 11.9375 | 1.500 | | 20.0 |
| FIG. 9B | CDC/SDC | 550 | | | 11.9500 | 1.571 | | 16.5 |

Figure 11:
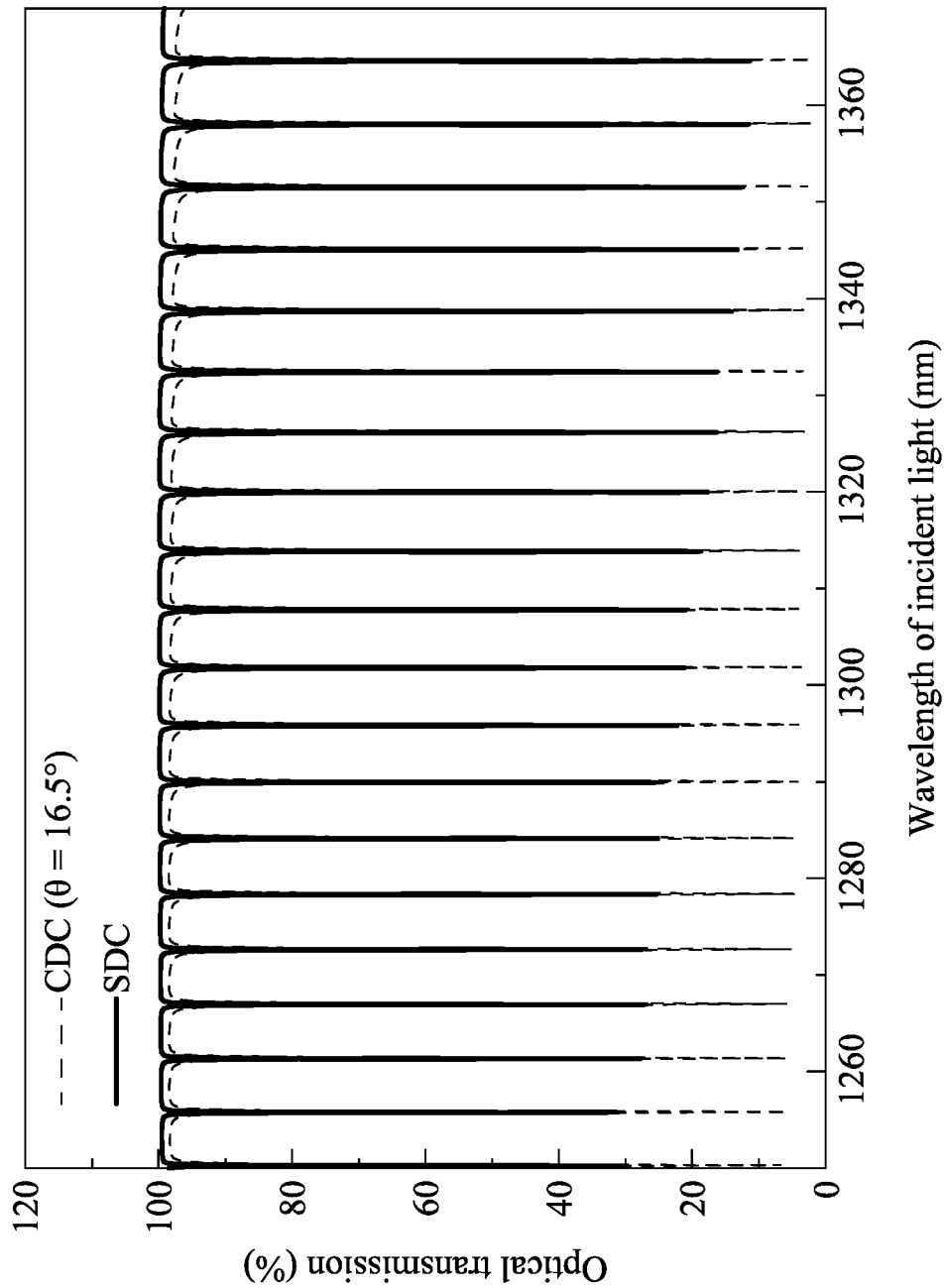
FIG. 11 illustrates a graph showing a simulated relationship of optical transmission coefficients with respect to an optical coupling section of a broadband ring resonator configured according to the configuration parameters shown in FIG. 9B and an optical coupling section of a resonate element having a long straight second waveguide in a broadband.

Please refer to FIG. 11. FIG. 11 illustrates a graph showing a simulated relationship of optical transmission coefficients with respect to an optical coupling section of a broadband ring resonator 10a configured according to the configuration parameters shown in FIG. 9B and an optical coupling section of a resonate element having a long straight second waveguide in a broadband. In FIG. 11, both the waveguide losses of the CDCs and the SDCs are set as 65 dB/cm. Several resonant conditions in various wavelength sections of a broadband (such as the corresponding wavelength section ranging from 1,250 nm to 1,370 nm) are met by the CDCs and the SDCs. Therefore, the incident lights of the second waveguides 14 of the CDCs and the SDCs can be respectively coupled to and confined in the corresponding first waveguides 12a. Hence, various signal dips (that is, resonant dips) of the output lights are shown in FIG. 11. In FIG. 11, depths of the signal dips of the CDCs are quite uniform (with extinction ratios of the signal dips being about 14±2 dB), which indicates that the CDCs (that is, in this embodiment, the broadband ring resonator 10a) shown in FIG. 11 can be indeed operated in a broadband (corresponding to a wavelength section ranging from 1,250 nm to 1,370 nm) with a high uniformity of several light output performances. In contrast, in FIG. 11, depths of the signal dips of the SDCs are apparently different from each other (for example, the difference between the light transmission coefficients of the wavelengths of 1,250 nm and 1,365 nm is about 10%), which indicates that the SDCs are indeed hard to be operated in the broadband (corresponding to a wavelength section ranging from 1,250 nm to 1,370 nm) and also hard to exhibit a high uniformity of several light output performances. Accordingly, a broadband ring resonator 10a according to some embodiments can indeed stably exhibit several high uniform light output performances (such as high uniform resonant dips and low optical losses/extinction ratios) in a broadband (corresponding to a wavelength section ranging from 1,250 nm to 1,370 nm, for example).

In some embodiments, in the step 4, the processor 54 adjusts four configuration parameters (including different coupling angles θ, coupling gaps $W_0$, first widths $W_1$, and second width $W_2$; with other configuration parameters fixed) based on the configuration parameters obtained from the step 3 to further allow the adjusted coupling ratios of the simulation resonate element 10b in a specific broadband to be in a range from 0% to 100%.

In some embodiments, a ratio of the first width $W_1$ with respect to the second width $W_2$ ranges from 1.3 to 1.7. In some embodiments, the first width $W_1$ ranges from 470 nm to 600 nm. In some embodiments, the coupling gap $W_0$ ranges from 150 nm to 250 nm. In some embodiments, the second width $W_2$ ranges from 300 nm to 400 nm. Accordingly, through the limitations of the ratios of the first width $W_1$ with respect to the second width $W_2$, and/or the limitations of the first widths $W_1$, and/or the limitations of the coupling gaps $W_0$, and/or the limitations of the second widths $W_2$, the first waveguide 12b according to some embodiments can be optically coupled by the second waveguide 14 with the coupling ratios of the second waveguide 14 coupled to the first waveguide 12b substantially approaching 100% (optionally, the coupling ratios may be further increased or decreased to a range of 0% to 85%, or to a range of 85% to 100%) at least in a wavelength section ranging from 1,250 nm to 1,370 nm.

Figure 12A:
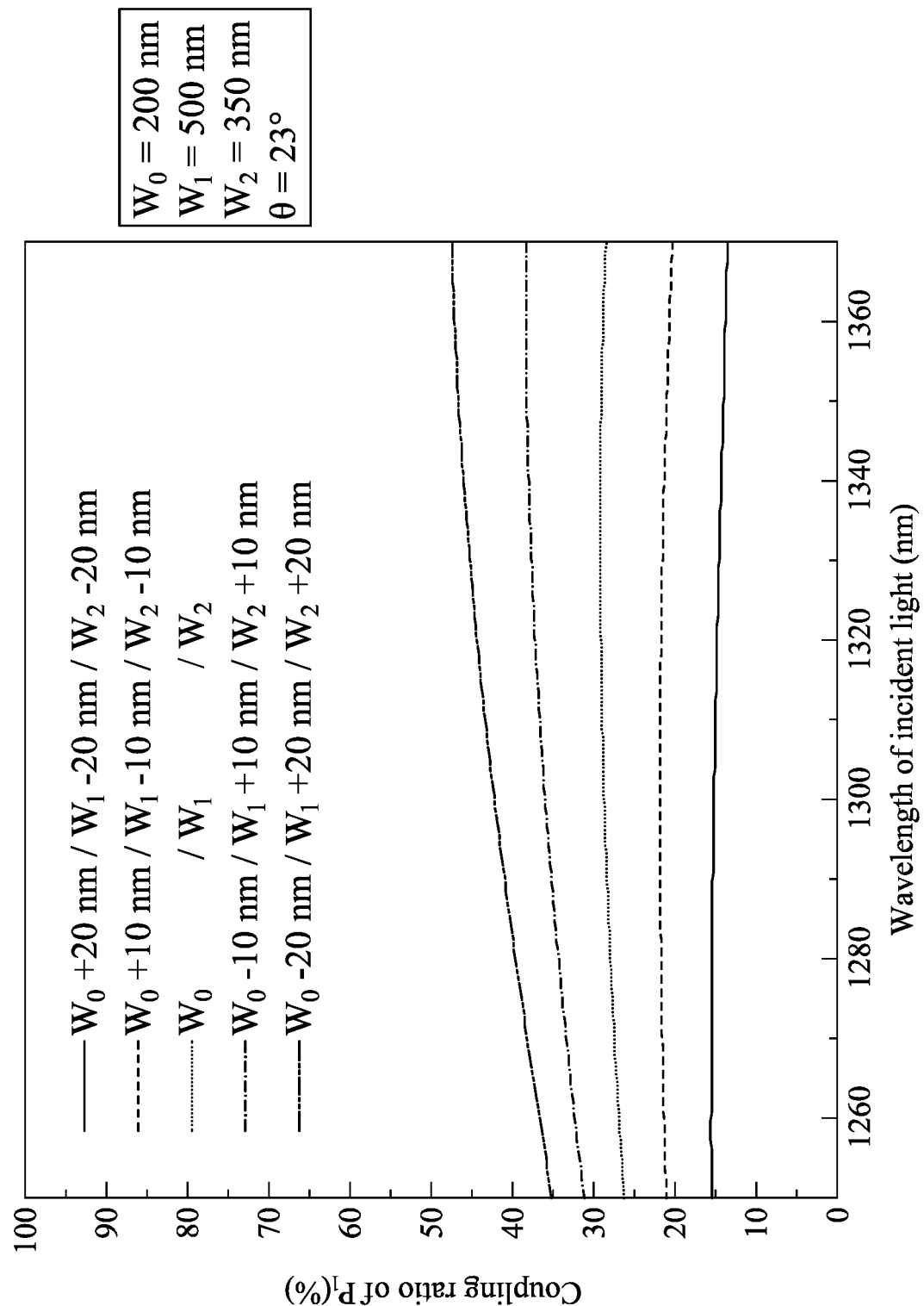
FIG. 12A illustrates a graph showing a simulated relationship of coupling ratios with respect to a simulation resonate element configured according to the configuration parameters shown in FIG. 7B and by adjusting the coupling gaps, the first widths, and the second widths of the simulation resonate element in a broadband.

Please refer to FIG. 12A. FIG. 12A illustrates a graph showing a simulated relationship of coupling ratios with respect to a simulation resonate element 10b configured according to the configuration parameters shown in FIG. 7B and by adjusting the coupling gaps $W_0$, the first widths $W_1$, and the second widths $W_2$ of the simulation resonate element 10b in a broadband. In FIG. 12A, the coupling gaps $W_0$ (200 nm), the first widths $W_1$ (500 nm), and the second widths $W_2$ (350 nm) shown in FIG. 7B are chosen to be adjusted (with other configuration parameters shown in FIG. 7B and TABLE 3 fixed, which are not described in detail here). In FIG. 12A, the processor 54 further adjusts various configuration parameters including the coupling gaps $W_0$ (+20 nm, +10 nm, −10 nm, and −20 nm; that is, 220 nm, 210 nm, 190 nm, and 180 nm), the first widths $W_1$ (−20 nm, −10 nm, +10 nm, and +20 nm; that is, 480 nm, 490 nm, 510 nm, and 520 nm), and the second widths $W_2$ (−20 nm, −10 nm, +10 nm, and +20 nm; that is, 330 nm, 340 nm, 360 nm, and 370 nm). Take the coupling ratios of the coupled ports $P_1$ based on the configuration parameters shown in FIG. 12A (that is, $W_0$=200 nm, $W_1$=500 nm, and $W_2$=350 nm) as a reference, where the coupling ratios are about 28%±1%; that is, from about 27% to about 29%. With the coupling gaps $W_0$ increased by 10 nm/20 nm by the processor 54 (while the first widths $W_1$ and the second widths $W_2$ are slightly decreased by about 10 nm/20 nm by the processor 54), the coupling ratios of the coupled ports $P_1$ are decreased by about 2% to about 17% and thus in a range between about 10% and about 25% (which is in an arbitrary range between 0% and 100% or any value in the arbitrary range). In contrast, with the coupling gaps $W_0$ slightly decreased by 10 nm/20 nm by the processor 54 (while the first widths $W_1$ and the second widths $W_2$ are slightly increased by about 10 nm/20 nm by the processor 54), the coupling ratios of the coupled ports $P_1$ are increased by about 1% to about 23% and thus in a range between about 30% and about 50% (which is in an arbitrary range between 0% and 100% or any value in the arbitrary range).

Figure 12B:
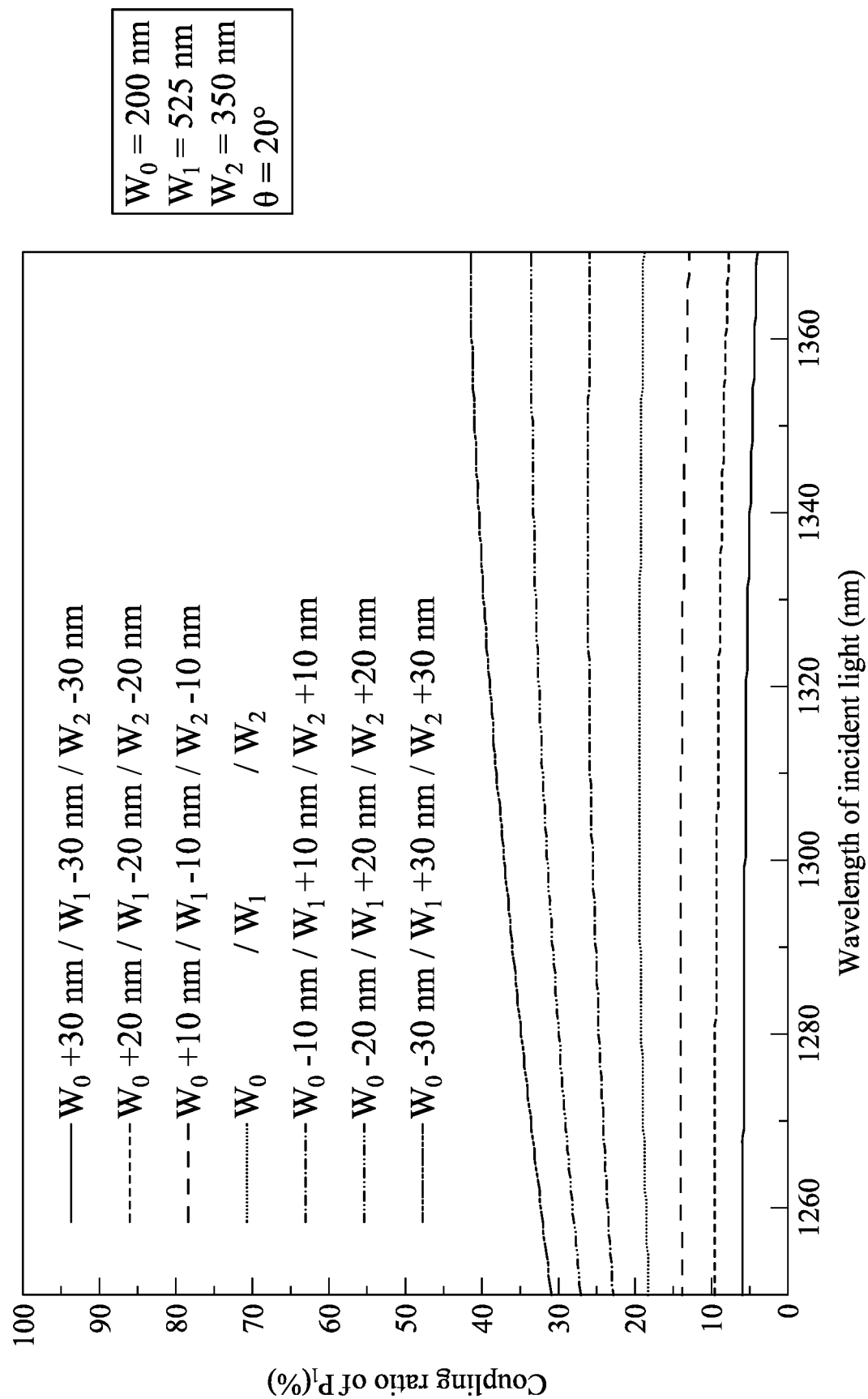
FIG. 12B illustrates a graph showing a simulated relationship of coupling ratios with respect to a simulation resonate element configured according to the configuration parameters shown in FIG. 8B and by adjusting the coupling gaps, the first widths, and the second widths of the simulation resonate element in a broadband.

Please refer to FIG. 12B. FIG. 12B illustrates a graph showing a simulated relationship of coupling ratios with respect to a simulation resonate element 10b configured according to the configuration parameters shown in FIG. 8B and by adjusting the coupling gaps $W_0$, the first widths $W_1$, and the second widths $W_2$ of the simulation resonate element 10b in a broadband. In FIG. 12B, the coupling gaps $W_0$ (200 nm), the first widths $W_1$ (525 nm), and the second widths $W_2$ (350 nm) shown in FIG. 8B are chosen to be adjusted (with other configuration parameters shown in FIG. 8B and TABLE 4 fixed, which are not described in detail here). In FIG. 12B, the processor 54 further adjusts various configuration parameters including the coupling gaps $W_0$ (+30 nm, +20 nm, +10 nm, −10 nm, −20 nm, and −30 nm; that is, 230 nm, 220 nm, 210 nm, 190 nm, 180 nm, and 170 nm), the first widths $W_1$ (−30 nm, −20 nm, −10 nm, +10 nm, +20 nm, and +30 nm; that is, 495 nm, 505 nm, 515 nm, 535 nm, 545 nm, and 555 nm), and the second widths $W_2$ (−30 nm, −20 nm, −10 nm, +10 nm, +20 nm, and +30 nm; that is, 320 nm, 330 nm, 340 nm, 360 nm, 370 nm, and 380 nm). Take the coupling ratios of the coupled ports $P_1$ based on the configuration parameters of FIG. 12B (that is, $W_0$=200 nm, $W_1$=525 nm, and $W_2$=350 nm) as a reference, where the coupling ratios are about 19%±1%; that is, from about 18% to about 20%. With the coupling gaps $W_0$ slightly increased by 10 nm/20 nm/30 nm by the processor 54 (while the first widths $W_1$ and the second widths $W_2$ are slightly decreased by about 10 nm/20 nm/30 nm by the processor 54), the coupling ratios of the coupled ports $P_1$ are decreased by about 3% to about 17% and thus in a range between about 3% and about 15% (which is in an arbitrary range between 0% and 100% or any value in the arbitrary range). In contrast, with the coupling gaps $W_0$ slightly decreased by 10 nm/20 nm/30 nm by the processor 54 (while the first widths $W_1$ and the second widths $W_2$ are slightly increased by about 10 nm/20 nm/30 nm by the processor 54), the coupling ratios of the coupled ports $P_1$ are increased by about 4% to about 24% and thus in a range between about 22% and about 24% (which is in an arbitrary range between 0% and 100% or any value in the arbitrary range).

Figure 12C:
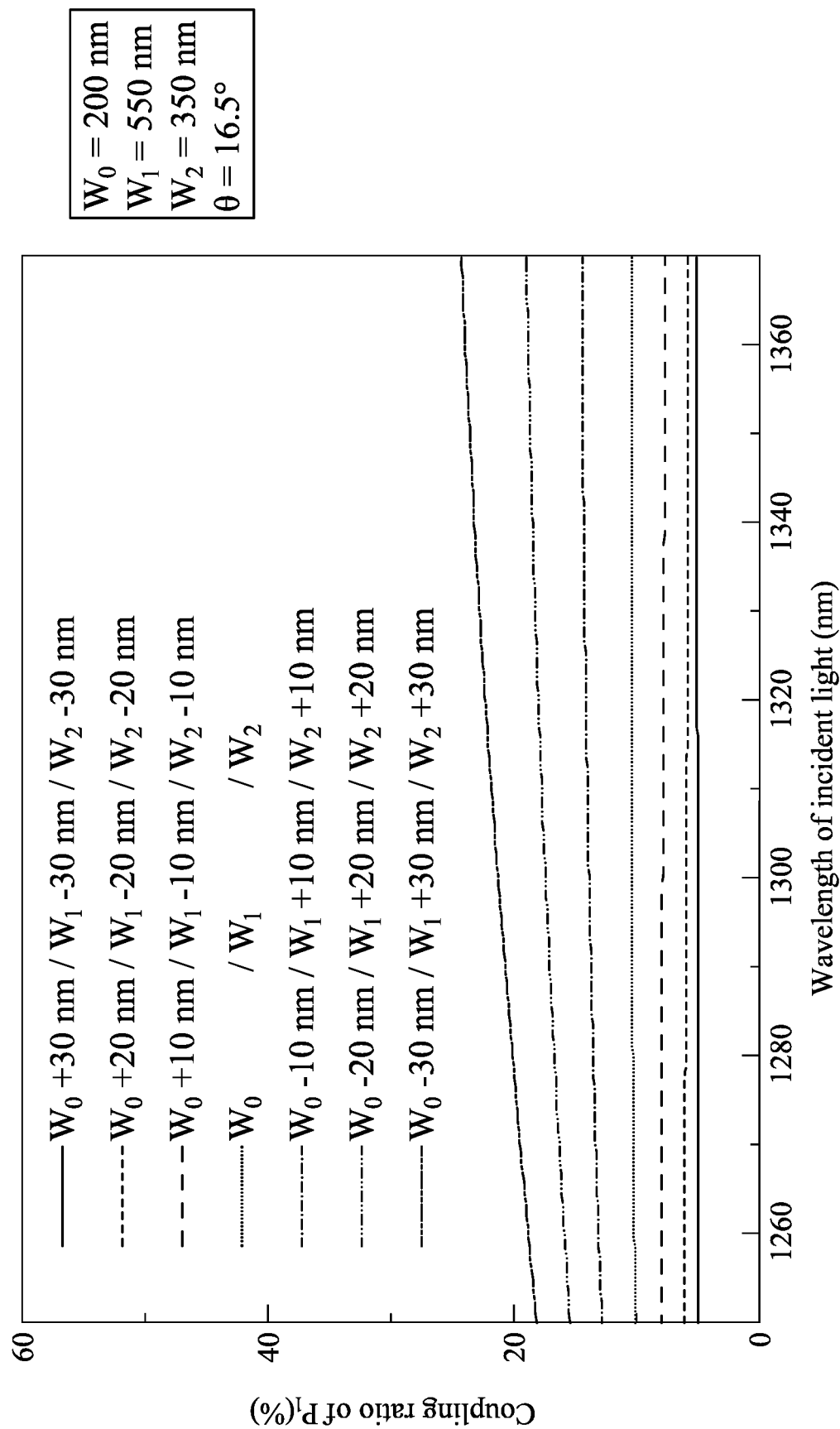
FIG. 12C illustrates a graph showing a simulated relationship of coupling ratios with respect to a simulation resonate element configured according to the configuration parameters shown in FIG. 9B and by adjusting the coupling gaps, the first widths, and the second widths of the simulation resonate element in a broadband.

Please refer to FIG. 12C. FIG. 12C illustrates a graph showing a simulated relationship of coupling ratios with respect to a simulation resonate element 10b configured according to the configuration parameters shown in FIG. 9B and by adjusting the coupling gaps $W_0$, the first widths $W_1$, and the second widths $W_2$ of the simulation resonate element 10b in a broadband. In FIG. 12C, the coupling gaps $W_0$ (200 nm), the first widths $W_1$ (550 nm), and the second widths $W_2$ (350 nm) shown in FIG. 9B are chosen to be adjusted (with other configuration parameters shown in FIG. 9B and TABLE 5 fixed, which are not described in detail here). In FIG. 12C, the processor 54 further adjusts various configuration parameters including the coupling gaps $W_0$ (+30 nm, +20 nm, +10 nm, −10 nm, −20 nm, and −30 nm; that is, 230 nm, 220 nm, 210 nm, 190 nm, 180 nm, and 170 nm), the first widths $W_1$ (−30 nm, −20 nm, −10 nm, +10 nm, +20 nm, and +30 nm; that is, 520 nm, 530 nm, 540 nm, 560 nm, 570 nm, and 580 nm), and the second widths $W_2$ (−30 nm, −20 nm, −10 nm, +10 nm, +20 nm, and +30 nm; that is, 320 nm, 330 nm, 340 nm, 360 nm, 370 nm, and 380 nm). Take the coupling ratios of the coupled ports $P_1$ based on the configuration parameters of FIG. 12C (that is, $W_0$=200 nm, $W_1$=550 nm, and $W_2$=350 nm) as a reference, where the coupling ratios are about 10%±0.5%; that is, from about 9.5% to about 10.5%. With the coupling gaps $W_0$ slightly increased by 10 nm/20 nm/30 nm by the processor 54 (while the first widths $W_1$ and the second widths $W_2$ are slightly decreased by about 10 nm/20 nm/30 nm by the processor 54), the coupling ratios of the coupled ports $P_1$ are decreased by about 1.5% to about 5.5% and thus in a range from about 5% to about 9% (which is in an arbitrary range between 0% and 100% or any value in the arbitrary range). In contrast, with the coupling gaps $W_0$ slightly decreased by 10 nm/20 nm/30 nm by the processor 54 (while the first widths $W_1$ and the second widths $W_2$ slightly increased by about 10 nm/20 nm/30 nm by the processor 54), the coupling ratios of coupled ports $P_1$ are increased by about 3.5% to about 13.5% and thus in a range between about 13% and about 23% (which is in an arbitrary range between 0% and 100% or any value in the arbitrary range).

From FIG. 12A to FIG. 12C, simply by slightly adjusting (which may be increasing or decreasing) the four configuration parameters (including the coupling angles θ, the coupling gaps $W_0$, the first widths $W_1$, and the second widths $W_2$) by the processor 54, the coupling ratios of the coupled ports $P_1$ then can be increased or decreased by about 1% to about 20% and thus in an arbitrary range between 0% and 100% or any value in the arbitrary range. Moreover, from FIG. 12A to FIG. 12C, slightly adjusting the configuration parameters may easily cause in relatively apparent impacts on the resulted coupling ratios of the coupled ports $P_1$. Therefore, the characteristics of the simulation resonate element 10b can be further applied to the process monitoring, so that the real-time monitoring results of the coupling ratios of the coupled ports $P_1$ can be used to further determine whether the preset processes related to each of the configuration parameters (such as the first width $W_1$ of the first coupling section 122) are abnormal or deviated from the norm or not. Accordingly, according to some embodiments, not only the errors of the processes can be controlled more precisely, the above characteristics can also be provided for adjusting the preset processes and the configuration parameters corresponding to the preset processes in time, so as to reduce unnecessary losses during the fabrication of the broadband ring resonator 10a.

Figure 13A:
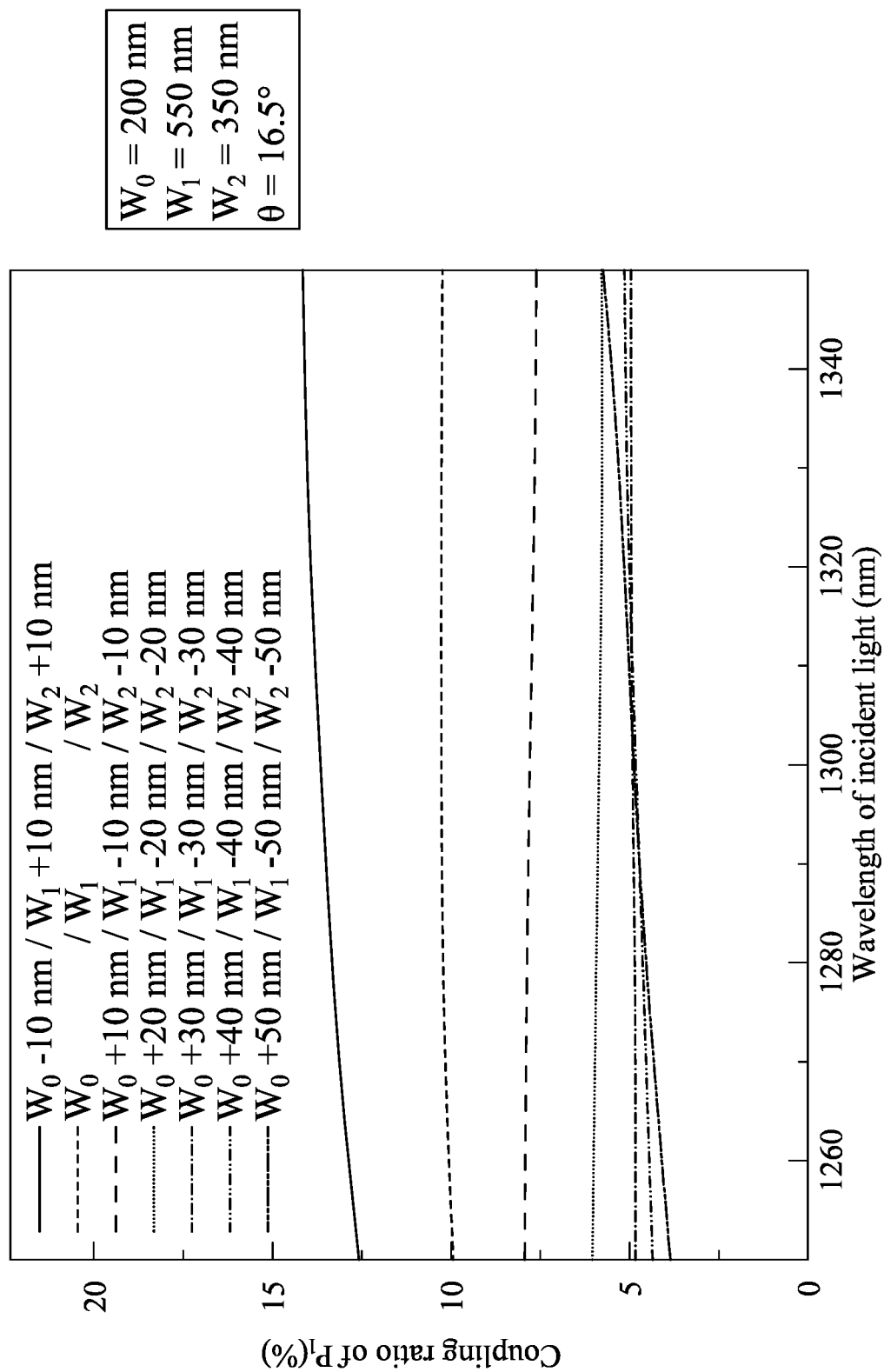
FIG. 13A illustrates a graph showing a simulated relationship of coupling ratios with respect to different coupling angles, first widths, and second widths of the simulation resonate element (with the coupling angle fixed; θ=16.5°) in a broadband according to some embodiments.
Figure 13B:
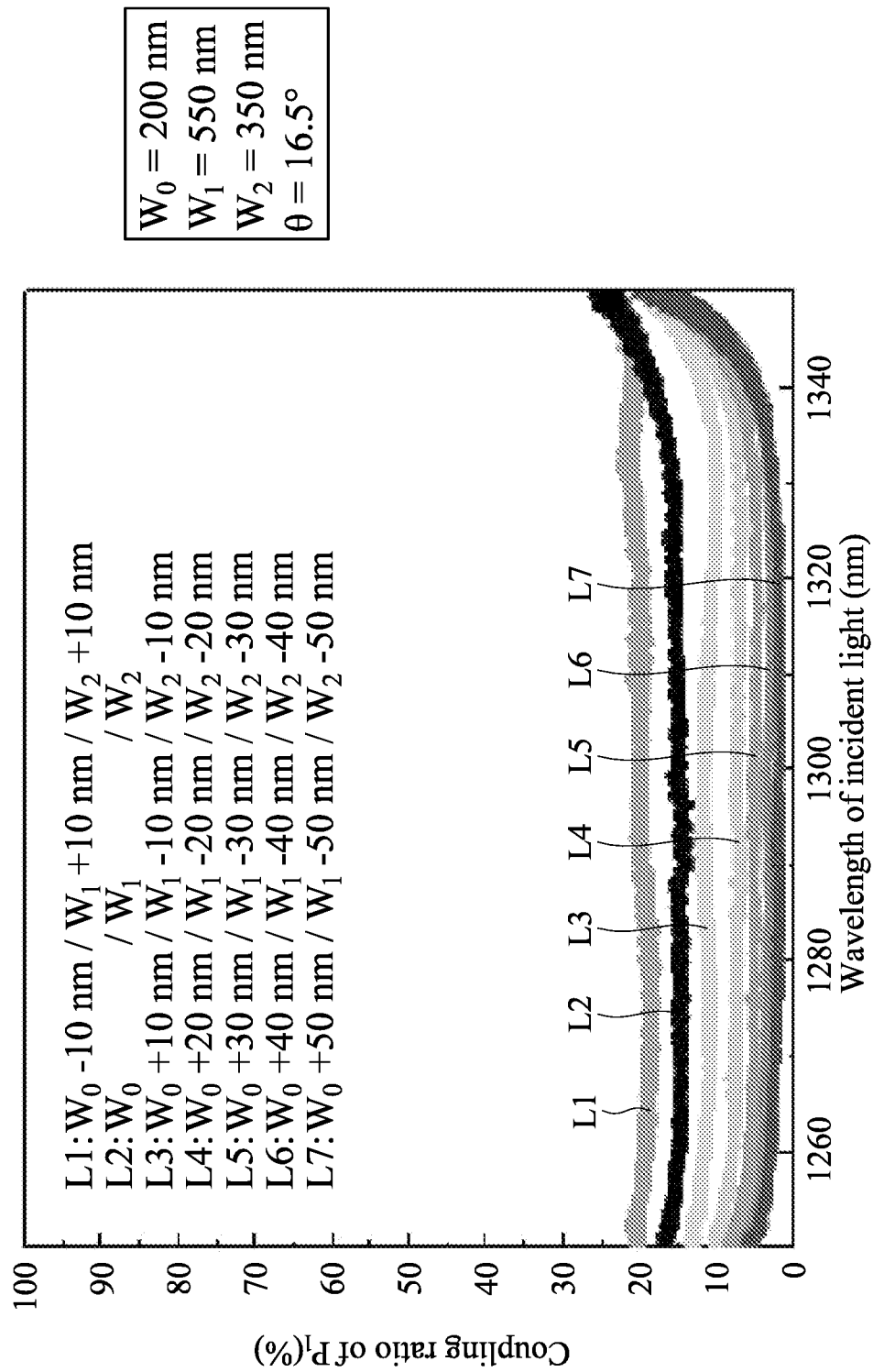
FIG. 13B illustrates a graph showing a practically measured relationship of coupling ratios with respect to a simulation resonate element configured according to the configuration parameters shown in FIG. 13A and by adjusting the coupling gaps, the first widths, and the second widths of the simulation resonate element in a broadband.
Figure 13C:
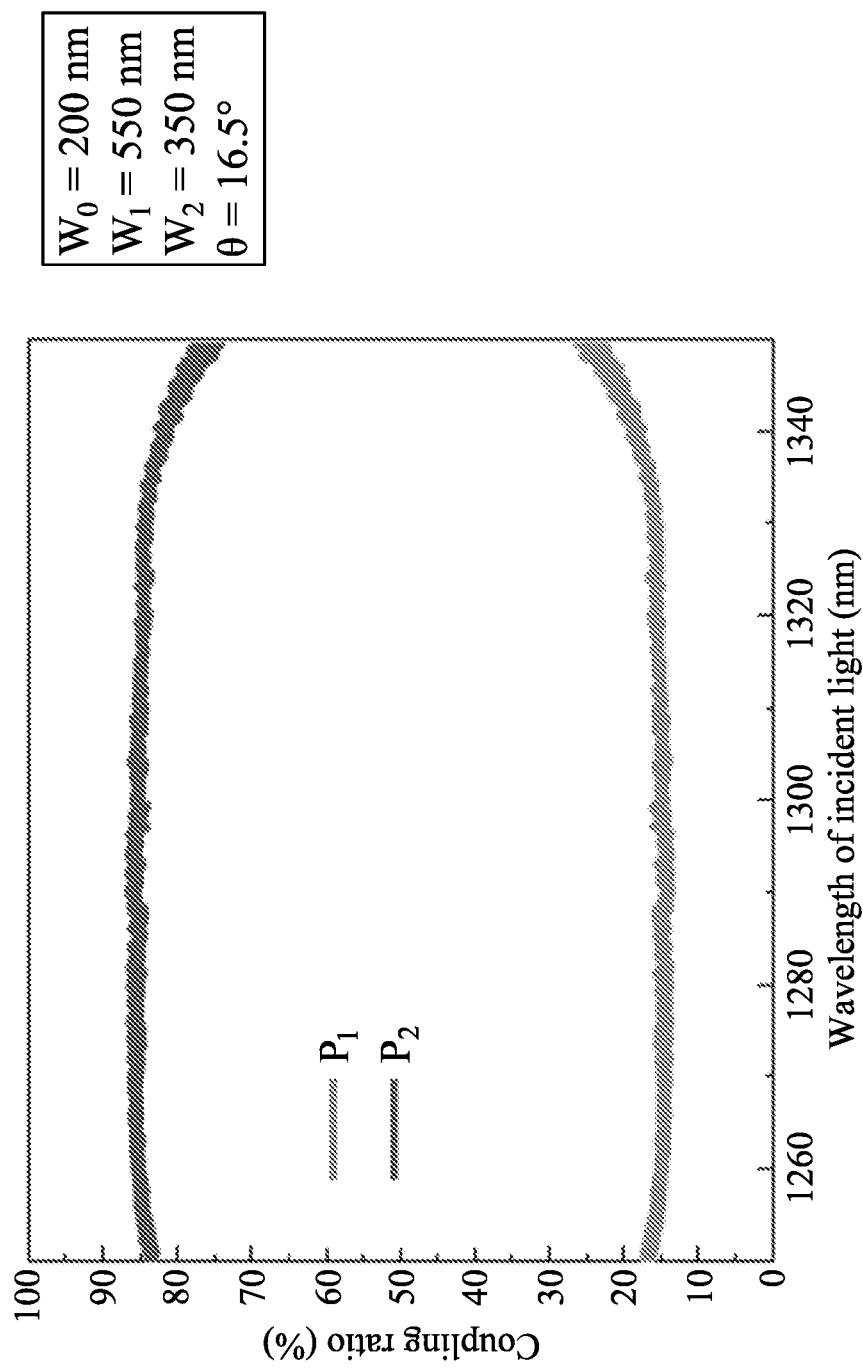
FIG. 13C illustrates a graph showing a practically measured relationship of coupling ratios with respect to a simulation resonate element configured according to the first configuration parameters shown in FIG. 13A and FIG. 13B in a broadband.
Figure 13D:
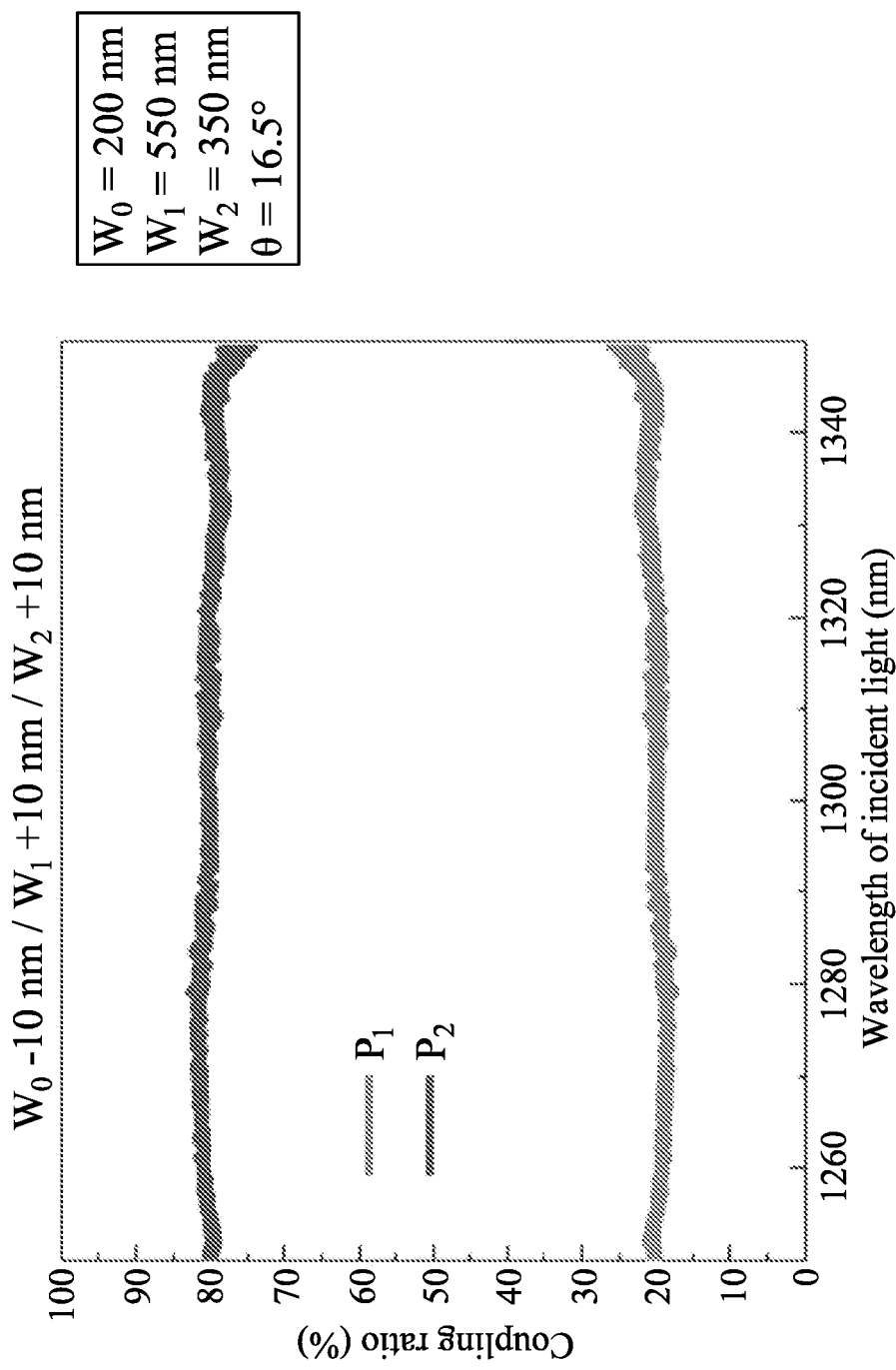
FIG. 13D illustrates a graph showing a practically measured relationship of coupling ratios with respect to a simulation resonate element configured according to the second configuration parameters shown in FIG. 13A and FIG. 13B in a broadband.
Figure 13E:
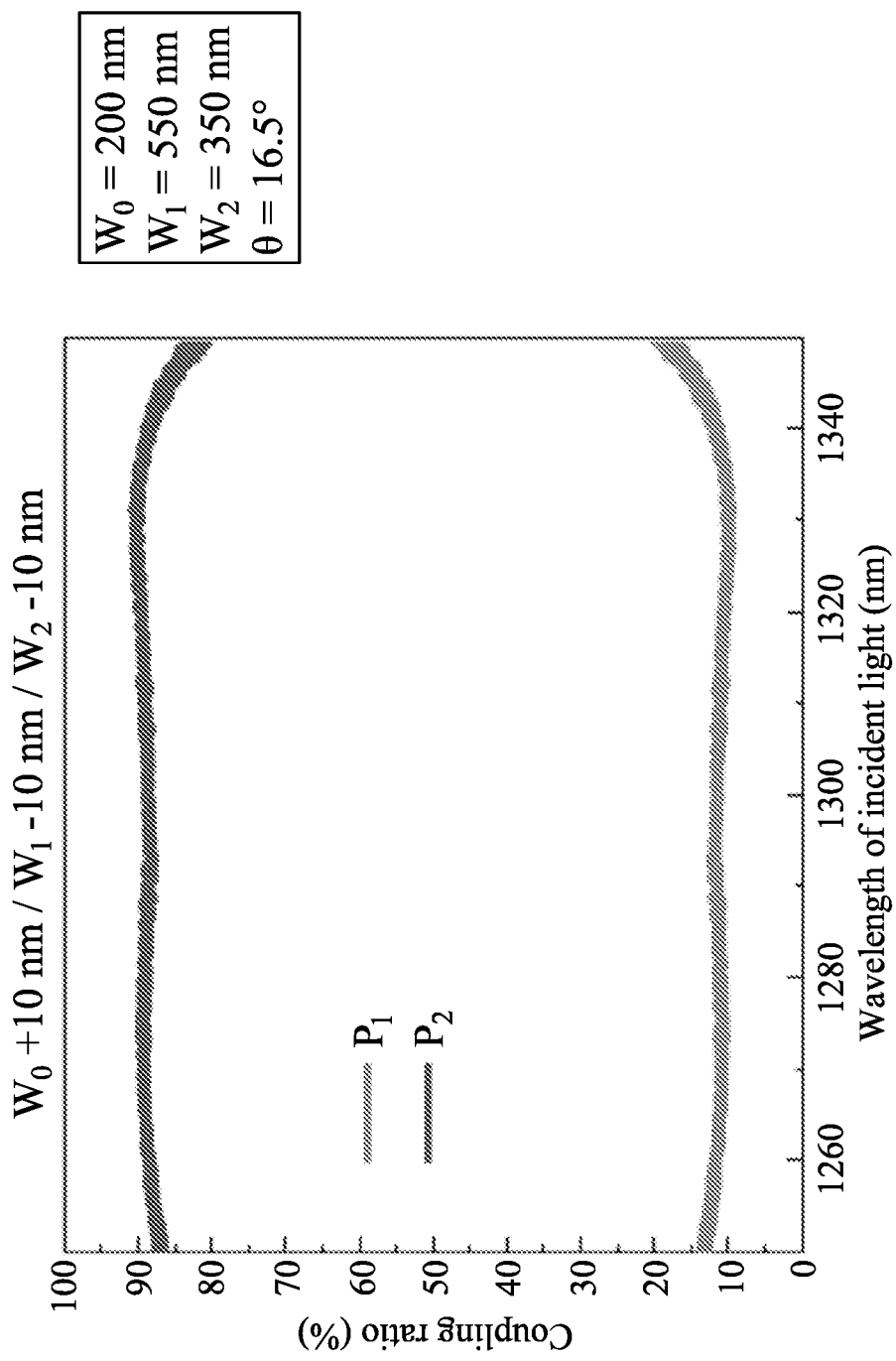
FIG. 13E illustrates a graph showing a practically measured relationship of coupling ratios with respect to a simulation resonate element configured according to the third configuration parameters shown in FIG. 13A and FIG. 13B in a broadband.
Figure 13F:
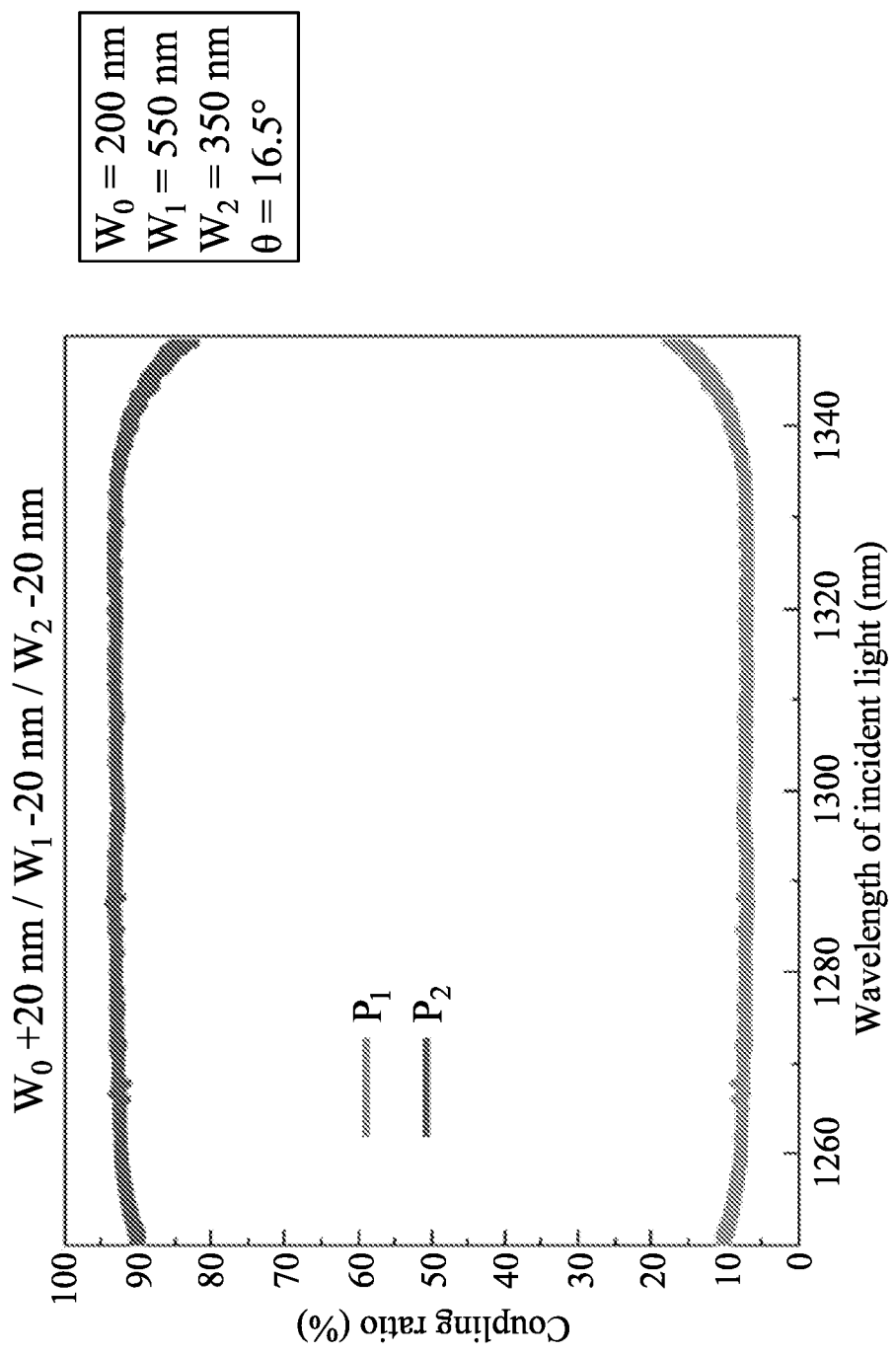
FIG. 13F illustrates a graph showing a practically measured relationship of coupling ratios with respect to a simulation resonate element configured according to the fourth configuration parameters shown in FIG. 13A and FIG. 13B in a broadband.
Figure 13G:
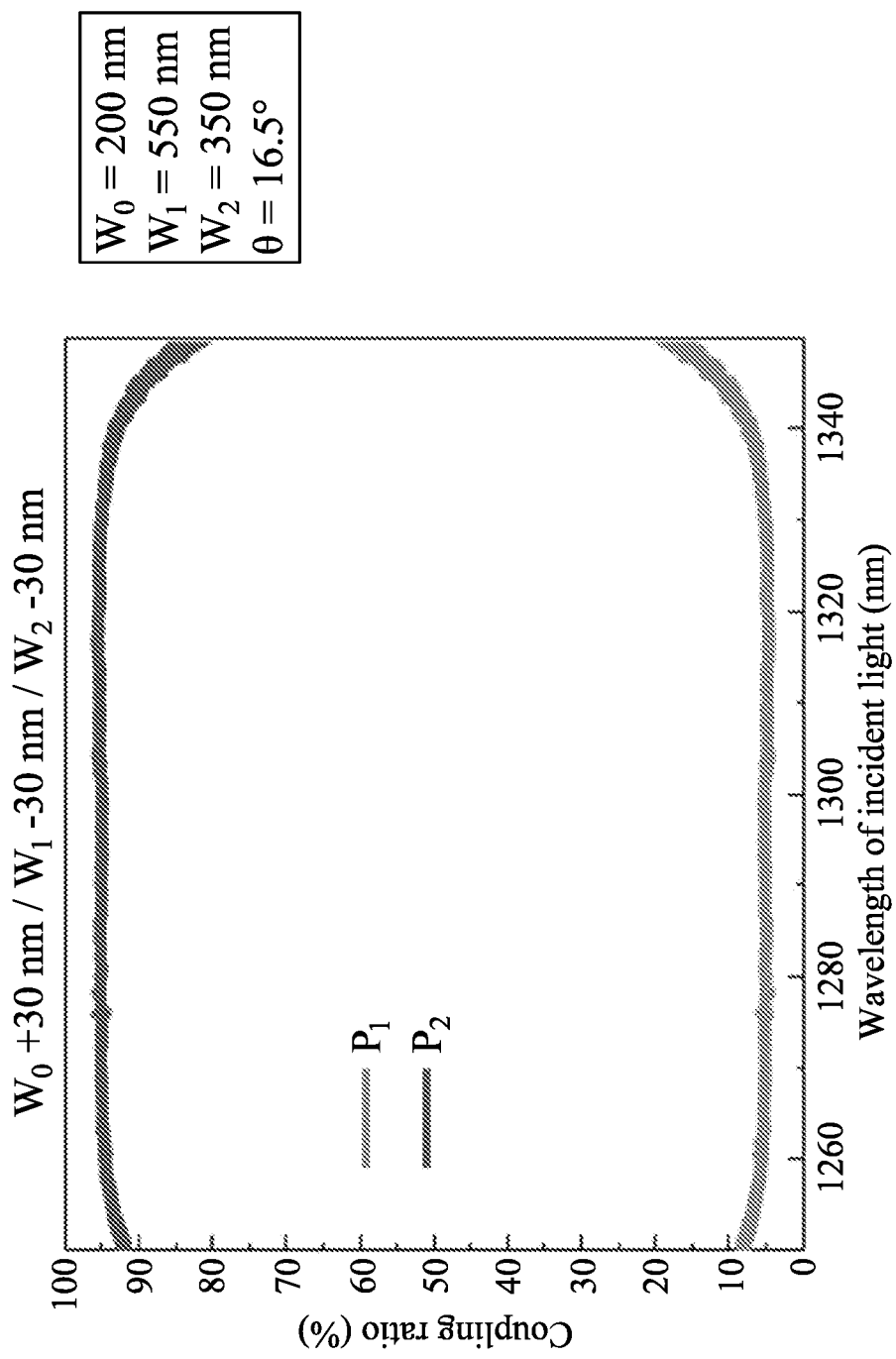
FIG. 13G illustrates a graph showing a practically measured relationship of coupling ratios with respect to a simulation resonate element configured according to the fifth configuration parameters shown in FIG. 13A and FIG. 13B in a broadband.
Figure 13H:
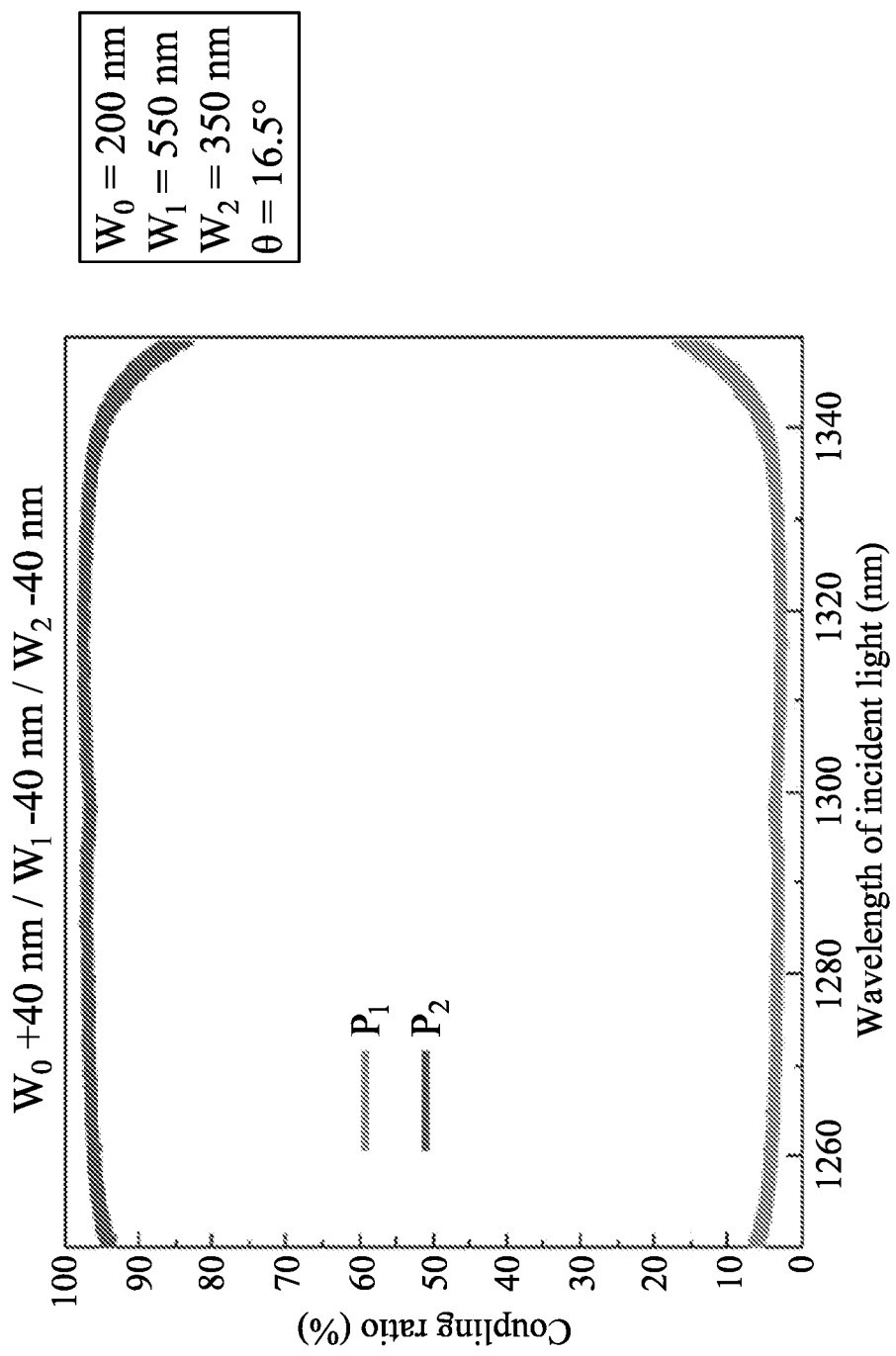
FIG. 13H illustrates a graph showing a practically measured relationship of coupling ratios with respect to a simulation resonate element configured according to the sixth configuration parameters shown in FIG. 13A and FIG. 13B in a broadband.
Figure 13I:
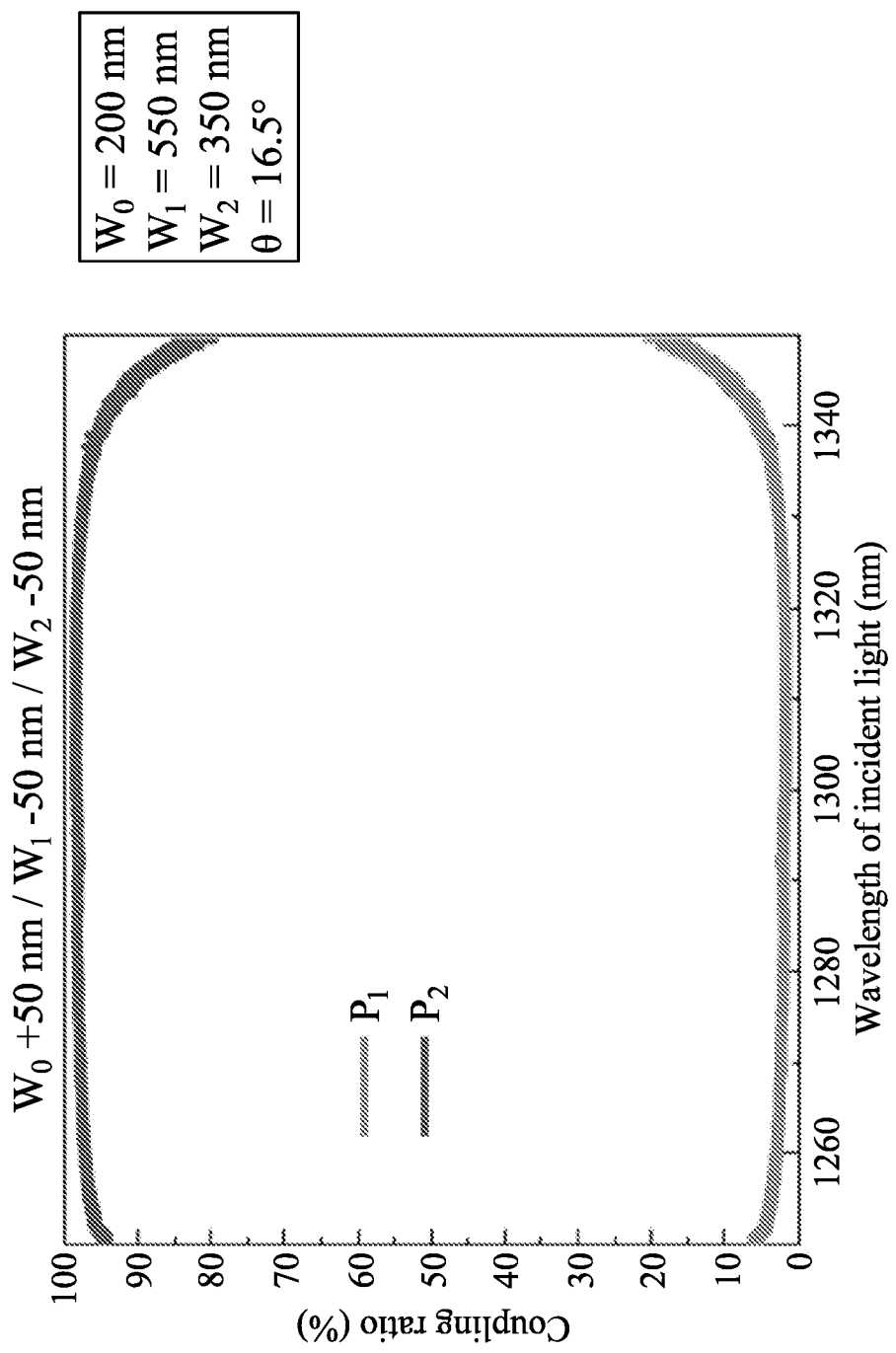
FIG. 13I illustrates a graph showing a practically measured relationship of coupling ratios with respect to a simulation resonate element configured according to the seventh configuration parameters shown in FIG. 13A and FIG. 13B in a broadband.

Please refer to FIG. 13A and FIG. 13B. FIG. 13A illustrates a graph showing a simulated relationship of coupling ratios with respect to different coupling angles θ, first widths $W_1$, and second widths $W_2$ of the simulation resonate element 10b (with the coupling angle θ fixed; θ=16.5° in a broadband according to some embodiments, and FIG. 13B illustrates a graph showing a practically measured relationship of coupling ratios with respect to a simulation resonate element 10b configured according to the configuration parameters shown in FIG. 13A and by adjusting the coupling gaps $W_0$, the first widths $W_1$, and the second widths $W_2$ of the simulation resonate element 10b in a broadband. In FIG. 13A and FIG. 13B, the coupling angles θ shown in FIG. 9B are fixed to 16.5°, and the coupling gaps $W_0$ (200 nm), the first widths $W_1$ (550 nm), and the second widths $W_2$ (350 nm) are chosen to be further adjusted as the first configuration parameters L1 to the seventh configuration parameters L7 (details of the configuration parameters are shown in FIG. 13B, while the other configuration parameters are as shown in FIG. 9B and TABLE 5, which are not be described in detail here). The applied measurements here can be referred to in the above paragraphs, which are thus not described in detail here.

Take the coupling ratios of the simulated coupled ports $P_1$ with the coupling gap $W_0$ (200 nm), the first width $W_1$ (550 nm), and the second width $W_2$ (350 nm) (that is, the second configuration parameters L2 corresponding to FIG. 13B) as a reference, where the coupling ratios are from about 14% to about 18%. In the wavelength section of the incident light ranging from 1,260 nm to 1,330 nm in FIG. 13B, the practically measured coupling ratios of the coupled ports $P_1$ with the second configuration parameters L2 are from about 9% to about 11%. The trends of the two coupling ratios of the coupled ports $P_1$ (that is, the simulated coupling ratios and the practically measured coupling ratios) are similar to each other with the differences being from about 3% to about 9%. From FIG. 3A and FIG. 3B, the similar trends can also be found in those simulated coupling ratios and the practically measured coupling ratios of the coupled ports $P_1$ with the first configuration parameters L1, and the third configuration parameters L3 to the seventh configuration parameters L7, which are not described in detail here. Hence, the simulated configuration parameters obtained by the design system 50 of the broadband ring resonator 10a can be indeed used to practically fabricate a broadband ring resonator 10a in a specific broadband (corresponding to a wavelength section ranging at least from 1,280 nm to 1,330 nm), thereby making the broadband ring resonator 10a have a high uniformity of several optical output performances in several bands of the broadband. It is noted that, the practically measured coupling ratios of the coupled ports $P_1$ shown on the two sides of FIG. 13B (that is, the wavelength sections of the incident lights ranging from 1,250 nm to 1,260 nm and 1,330 nm to 1,350 nm, respectively) differ apparently from the simulated coupling ratios of the coupled ports $P_1$ shown in FIG. 13A. The reason is that the measurements are limited by the broadband limitations of the input and output interface (such as a grating coupler), and thus the measurements are not the actual performances of the curved directional couplers (CDCs). Therefore, if other optical input and output interfaces are used to measure the coupling ratios of the components in edge emission couplers, the above impacts on the broadband limitations can be then appropriately solved. Accordingly, in some embodiments, the simulated configuration parameters obtained by the design system 50 of the broadband ring resonator 10a can be indeed used to practically fabricate a broadband ring resonator 10a in a specific broadband (corresponding to a wavelength section ranging at least from 1,260 nm to 1,330 nm).

Please refer to FIG. 9B, and FIG. 13C to FIG. 13I. FIG. 13C to FIG. 13I respectively illustrate graphs showing practically measured relationships of coupling ratios with respect to simulation resonate elements 10b configured according to the first configuration parameters L1 to the seventh configuration parameters L7 shown in FIG. 13A and FIG. 13B in a broadband. In FIG. 13C to FIG. 13I, the coupling angles θ shown in FIG. 9B are fixed to 16.5°, and the coupling gaps $W_0$ (200 nm), the first widths $W_1$ (550 nm), and the second widths $W_2$ (350 nm) are chosen to be further adjusted as the first configuration parameters L1 to the seventh configuration parameters L7 (details of the configuration parameters are shown in FIG. 13B, while the other configuration parameters are as shown in FIG. 9B and TABLE 5, which are not be described in detail here).

Take the coupling ratios of the simulated through ports $P_2$ shown in FIG. 9B as a reference, where the coupling ratios are from about 89% to 91%. In the wavelength section of the incident light ranging from 1,260 nm to 1,330 nm in FIG. 13C, the practically measured coupling ratios of the through ports $P_2$ are from about 83% to about 87%. The trends of the two coupling ratios of the through ports $P_2$ (that is, the simulated coupling ratios and the practically measured coupling ratios) are similar to each other with the differences being from about 6% to about 8%. Hence, by combining the trends of the differences of the coupling ratios of the coupled ports $P_1$ and the through ports $P_2$, the simulated coupling ratios obtained by the design system 50 of the broadband ring resonator 10a are indeed similar to those obtained by practical measurements, which are advantageous to be applied to practically fabricate a broadband ring resonator 10a in a specific broadband (corresponding to a wavelength section ranging at least from 1,260 nm to 1,330 nm). Accordingly, when practically fabricating the broadband ring resonators 10a, the simulated configuration parameters can be applied directly or by just some subtle adjustments to exhibit a high uniformity of several optical output performances in a specific broadband (corresponding to a wavelength section ranging at least from 1,260 nm to 1,330 nm) according to some embodiments.

Likewise, in FIG. 13D to FIG. 13I, the coupling gaps $W_0$ (200 nm), the first widths $W_1$ (550 nm), and the second widths $W_2$ (350 nm) are respectively decreased or increased to be as the first configuration parameters L1 and the third configuration parameters L3 to the seventh configuration parameters L7 as shown in FIG. 3B. From FIG. 13D to FIG. 13I, the stable and similar trends of the coupling ratios of the coupled ports $P_1$ and the through ports $P_2$ in each figure can be obtained in the wavelength section ranging at least from 1,260 nm to 1,330 nm. Hence, according to some embodiments, by combining the trends of the differences of the coupling ratios of the coupled ports $P_1$ and the through ports $P_2$, though with different coupling gaps $W_0$, first widths $W_1$, and second widths $W_2$, the simulated coupling ratios obtained by the design system 50 of the broadband ring resonator 10a are indeed similar to those obtained by practical measurements, which is advantageous to be applied to practically fabricate a broadband ring resonator 10a in a specific broadband (corresponding to a wavelength section ranging at least from 1,260 nm to 1,330 nm). Accordingly, when practically fabricating the broadband ring resonators 10a, the simulated configuration parameters can be applied directly or by just some subtle adjustments to exhibit a high uniformity of several optical output performances in a specific broadband (corresponding to a wavelength section ranging at least from 1,260 nm to 1,330 nm) according to some embodiments.

Moreover, from FIG. 13A to FIG. 13E, when practically fabricating the broadband ring resonators 10a, an allowable process window of the coupling gaps $W_0$, the first width $W_1$, and the second widths $W_2$ may be ±10 nm (with the corresponding coupling ratios being about ±5% to ±7%), which allows the simulated configuration parameters to be applied directly or by just some subtle adjustments, so as to exhibit a high uniformity of several optical output performances in a specific broadband (corresponding to a wavelength section ranging at least from 1,260 nm to 1,330 nm).

To sum up, in some embodiments, since configuration parameters between a first waveguide and a second waveguide of a broadband ring resonator are obtained by simulation of a design system of the broadband ring resonator, and thus the first waveguide and the second waveguide are substantially matched to each other. Therefore, the coupling ratios in a broadband that are substantially matched to each other in a range between 0% and 100% can be further practically obtained. Moreover, the coupling ratios can be allowed by simply adjusting at least a width of the first waveguide (that is, the aforementioned first width) without significantly adjusting the other configuration parameters (such as a curvature radius of the second waveguide, that is, the aforementioned second curvature radius). Accordingly, since several resonant and coupling requirements of various wavelength sections in a broadband are met, a high uniformity of several optical output performances of the broadband ring resonator can be further obtained. Hence, even devices are fabricated in micron scales, the broadband ring resonators having good and stable optical output performances as well as less and uniform optical losses can be still obtained by simply adjusting the coupling ratios without significantly adjusting the other configuration parameters (such as a curvature radius of the second waveguide, that is, the aforementioned second curvature radius), thereby improving its fabrication processes with more advantages and expanding its fields of potential applications.

Although the present disclosure is disclosed in the foregoing embodiments as above, it is not intended to limit the present disclosure. Any person who is familiar with the relevant art can make some changes and modifications without departing from the spirit and scope of the present disclosure. Therefore, the scope of the present disclosure shall be subject to the definition of the scope of patent application attached to the specification.

What is claimed is:

1. A broadband ring resonator comprising:
    a first waveguide being a closed loop having a first coupling section, wherein the first coupling section has a first width and a first curvature radius; and
    a second waveguide comprising a first section, a second coupling section, and a second section which are sequentially connected to each other, wherein the second coupling section has a second width and a second curvature radius, and a coupling ratio of the second waveguide is coupled to a coupling ratio of the first waveguide in a broadband, the coupling ratios of the first waveguide and the second waveguide are have a similarity to each other;
    wherein the first curvature radius, the second curvature radius, the first width, and the second width are obtained according to a graph showing the relation of radius and effective index as shown in FIG. 5 and a relation of radius and effective index represented by Formula 1, $$100\% = \frac{n_{eff1}}{n_{eff2}} \cdot \frac{R_1}{R_2} \pm d \quad \text{(Formula 1)}$$

wherein $n_{eff1}$ represents a first effective index, $n_{eff2}$ represents a second effective index, $R_1$ represents the first curvature radius, $R_2$ represents the second curvature radius, and d represents a tolerance not greater than 10%;

wherein the second curvature radius is greater than the first curvature radius, the first width ranges from 470 nm to 600 nm, the second width ranges from 300 nm to 400 nm, and $1.3 \leq W_1/W_2 \leq 1.7$, wherein $W_1$ is the first width and $W_2$ is the second width.

2. The broadband ring resonator according to claim 1, wherein a coupling angle is respectively between two ends of the first coupling section and between two ends of the second coupling section, and the first coupling section and the second coupling section are separated by a coupling gap.

3. The broadband ring resonator according to claim 2, wherein the coupling gap ranges from 150 nm to 250 nm.

4. The broadband ring resonator according to claim 2, wherein a wavelength section of incident light corresponding to the broadband ranges from 1,250 nm to 1,370 nm.

5. The broadband ring resonator according to claim 2, wherein a wavelength section of incident light corresponding to the broadband ranges from 1,280 nm to 1,330 nm.

6. The broadband ring resonator according to claim 2, wherein the coupling ratios that have a similarity to each other range from 0% to 85%.

7. The broadband ring resonator according to claim 2, wherein the coupling ratios that have a similarity to each other range from 85% to 100%.

8. The broadband ring resonator according to claim 2, wherein the coupling ratios that have a similarity to each other are obtained by adjusting one selected from the group consisting of the coupling angle, the first width, and a combination thereof.

9. The broadband ring resonator according to claim 2, wherein the coupling ratios that have a similarity to each other are obtained by adjusting the first width.

10. The broadband ring resonator according to claim 9, wherein the first width has a width adjustment, and the coupling ratios that have a similarity to each other are obtained respectively by adjusting the first width with half of the width adjustment toward a center of the first waveguide and by adjusting the first width with half of the width adjustment away from the center of the first waveguide.

11. The broadband ring resonator according to claim 2, further comprising:
    a base layer;
    a first protection layer on the base layer;
    a waveguide layer on the first protection layer, wherein the first waveguide and the second waveguide are on the waveguide layer; and
    a second protection layer on the waveguide layer.

12. A design system of broadband ring resonator, for obtaining configuration parameters of a broadband ring resonator based on a simulation resonate element, wherein the simulation resonate element has a first waveguide and a second waveguide, the first waveguide comprises a first coupling section, the second waveguide comprises a second coupling section, a coupling angle is respectively between two ends of the first coupling section and between two ends of the second coupling section, and the first coupling section and the second coupling section are separated by a coupling gap; the design system of the broadband ring resonator comprises:
- a user interface for receiving the coupling gap, a plurality of waveguide widths, and a plurality of waveguide radius; and
- a processor for being in communication with the user interface, wherein the processor:
- obtains a relation of radius and effective index to obtain a width of the first coupling section, a curvature radius of the first coupling section, a width of the second coupling section, and a curvature radius of the second coupling section based on the relation of radius and effective index;
- adjusts the coupling angle and a coupling ratio of the second waveguide is coupled to a coupling ratio of the first waveguide in a broadband band, wherein the coupling ratios of the first waveguide and the second waveguide have a similarity to each other by adjusting the coupling angle;
- adjusts one selected from the group consisting of the width of the first coupling section, the curvature radius of the first coupling section, the width of the second coupling section, the curvature radius of the second coupling section, the coupling gap, the coupling angle, and any combination thereof, and the coupling ratios in the broadband range from 0% to 100%; and
- outputs the configuration parameters comprising the width of the first coupling section, the curvature radius of the first coupling section, the width of the second coupling section, the curvature radius of the second coupling section, the coupling gap, and the coupling angle.

13. The design system of broadband ring resonator according to claim 12, wherein the processor further adjusts one of the configuration parameters to increase or decrease the coupling ratios originally ranging from 0% to 100% by 1% to 20% to output the increased or decreased coupling ratios and the configuration parameters corresponding to the increased or decreased coupling ratios.

14. The design system of broadband ring resonator according to claim 12, wherein the processor further adjusts one selected from the group consisting of the width of the first coupling section, the coupling angle, and a combination thereof to increase or decrease the coupling ratios originally ranging from 0% to 100% by 1% to 20% to output the increased or decreased coupling ratios and the configuration parameters corresponding to the increased or decreased coupling ratios.

15. The design system of broadband ring resonator according to claim 12, wherein the relation of radius and effective index meets Formula 1, $$100\% = \frac{n_{\it{eff1}}}{n_{\it{eff2}}} \cdot \frac{R_1}{R_2} \pm d \qquad \text{(Formula 1)}$$

wherein $n_{\it{eff1}}$ represents a first effective index, $n_{\it{eff2}}$ represents a second effective index, $R_1$ represents the first curvature radius, $R_2$ represents the second curvature radius, and d represents a tolerance not greater than 10%.

16. The design system of broadband ring resonator according to claim 12, wherein a wavelength section of incident light corresponding to the broadband ranges from 1,250 nm to 1,370 nm.

17. The design system of broadband ring resonator according to claim 12, wherein a wavelength section of incident light corresponding to the broadband ranges from 1,280 nm to 1,330 nm.

* * * * *